(12) United States Patent
Saeki

(10) Patent No.: US 10,194,443 B2
(45) Date of Patent: Jan. 29, 2019

(54) TRANSMITTER AND COMMUNICATION SYSTEM

(71) Applicant: Sony Corporation, Tokyo (JP)

(72) Inventor: Takanori Saeki, Kanagawa (JP)

(73) Assignee: Sony Corporation, Tokyo (JP)

( * ) Notice: Subject to any disclaimer, the term of this patent is extended or adjusted under 35 U.S.C. 154(b) by 179 days.

(21) Appl. No.: 15/122,312

(22) PCT Filed: Mar. 4, 2015

(86) PCT No.: PCT/JP2015/056305
§ 371 (c)(1),
(2) Date: Aug. 29, 2016

(87) PCT Pub. No.: WO2015/146511
PCT Pub. Date: Oct. 1, 2015

(65) Prior Publication Data
US 2016/0374091 A1 Dec. 22, 2016

(30) Foreign Application Priority Data
Mar. 25, 2014 (JP) .................. 2014-062570

(51) Int. Cl.
H04W 72/04 (2009.01)
H04W 52/50 (2009.01)
H04W 52/42 (2009.01)
H04L 25/02 (2006.01)

(52) U.S. Cl.
CPC ..... *H04W 72/0473* (2013.01); *H04L 25/0288* (2013.01); *H04W 52/42* (2013.01); *H04W 52/50* (2013.01)

(58) Field of Classification Search
CPC ....... H04L 2025/03363; H04L 25/0272; H04L 25/0288; H04L 25/062; H04L 25/4917; H03L 5/00
See application file for complete search history.

(56) References Cited

U.S. PATENT DOCUMENTS

| 7,724,161 B1 | 5/2010 | Cyrusian |
| 2005/0134305 A1 | 6/2005 | Stojanovic et al. |

(Continued)

FOREIGN PATENT DOCUMENTS

| JP | 2000-165456 A | 6/2000 |
| JP | 2001-506448 A | 5/2001 |

(Continued)

OTHER PUBLICATIONS

Extended European Search Report dated Feb. 20, 2018 for corresponding European Application No. 15768262.3.

(Continued)

*Primary Examiner* — Aristocratis Fotakis
(74) *Attorney, Agent, or Firm* — Michael Best & Friedrich LLP

(57) ABSTRACT

A transmitter of the present disclosure includes: an output terminal; a driver that performs transition of a voltage of the output terminal among a plurality of voltages; and a controller that controls the driver to cause transition start timing in one voltage transition in voltage transition among the plurality of voltages to be later than transition start timing in another voltage transition.

15 Claims, 31 Drawing Sheets

(56) References Cited

U.S. PATENT DOCUMENTS

| | | | |
|---|---|---|---|
| 2006/0188043 A1* | 8/2006 | Zerbe | H04L 1/0026 375/346 |
| 2007/0182461 A1* | 8/2007 | Harvey | H03K 19/0019 327/112 |
| 2009/0122904 A1* | 5/2009 | Jang | H04L 25/028 375/286 |
| 2010/0164539 A1* | 7/2010 | Balamurugan | H03K 19/018585 326/30 |
| 2014/0240208 A1* | 8/2014 | Kim | G09G 3/3696 345/87 |
| 2015/0180475 A1* | 6/2015 | Priel | H03K 19/00384 327/108 |

FOREIGN PATENT DOCUMENTS

| | | |
|---|---|---|
| JP | 2006-014327 A | 1/2006 |
| JP | 2010-520715 A | 6/2010 |
| JP | 2011-517159 A | 5/2011 |
| JP | 2012-044394 A | 3/2012 |
| WO | 2013/157196 A1 | 10/2013 |

OTHER PUBLICATIONS

European Patent Office Communication Pursuant to Rule 164(1) EPC, Partial Supplementary European Search Report dated Oct. 27, 2017 for corresponding European Application No. 15768268.3.

Japanese Office Action dated Aug. 28, 2018 for corresponding Japanese Application No. 2016-510188.

* cited by examiner

[ FIG. 1 ]
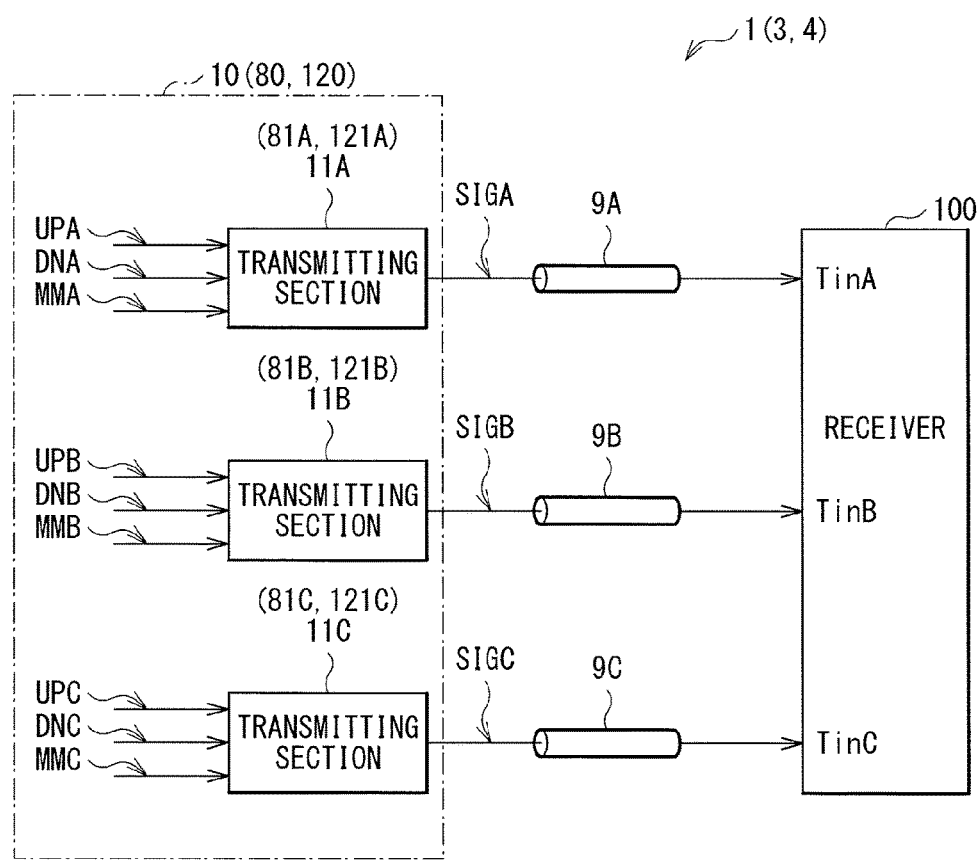

[ FIG. 2 ]
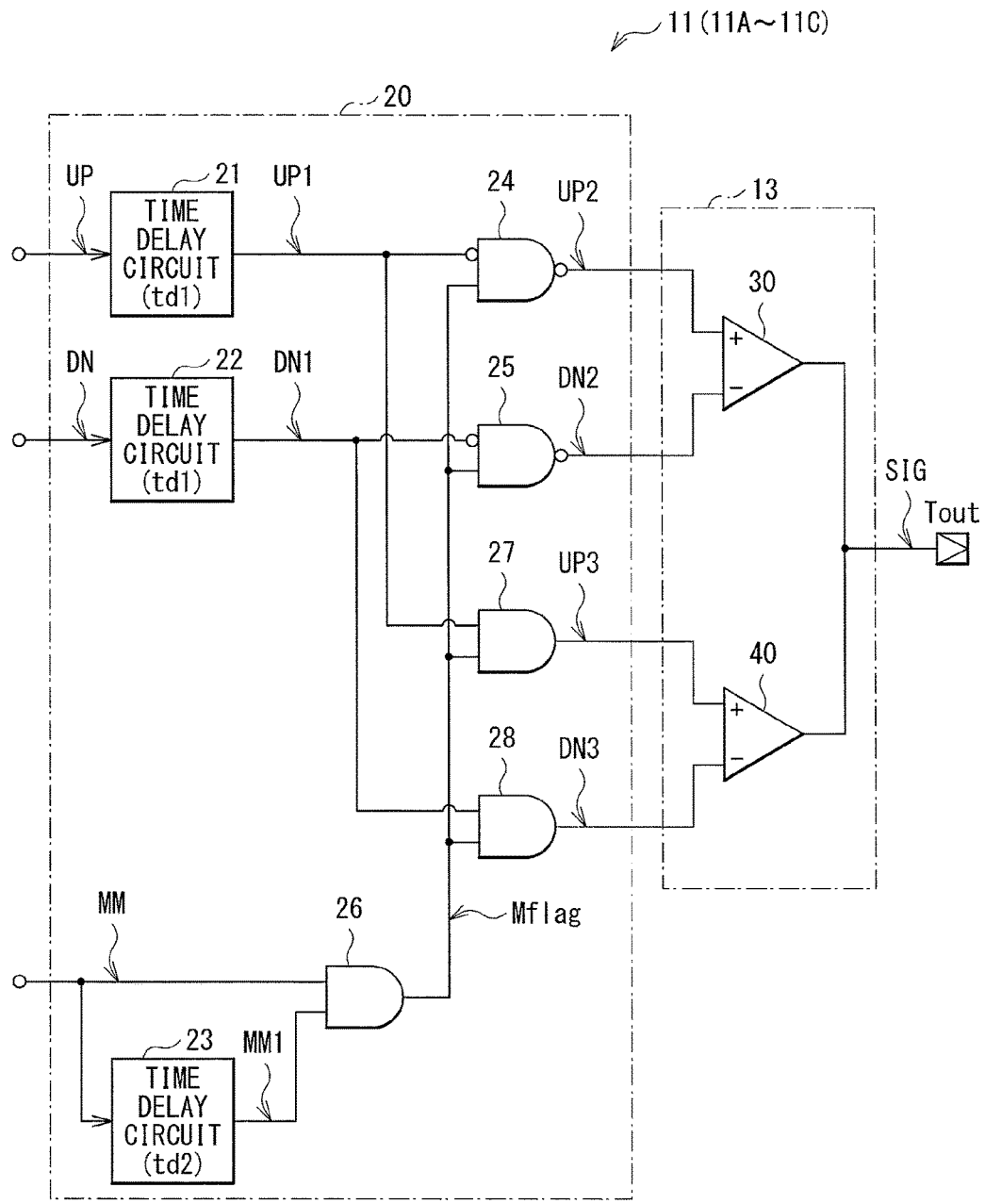

[ FIG. 3 ]
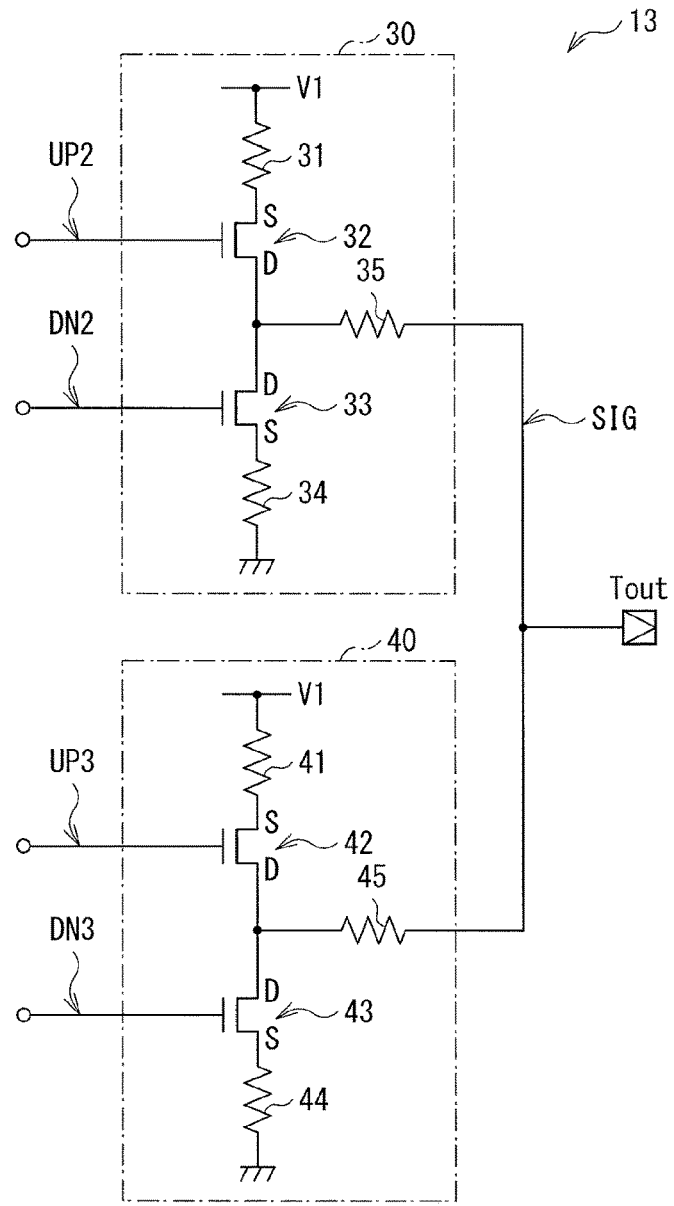
[ FIG. 4 ]
| UP | DN | MM | SIG |
|----|----|----|-----|
| 1  | 0  | 1  | VH  |
| 0  | 1  | 1  | VL  |
| X  | X  | 0  | VM  |

[ FIG. 5 ]
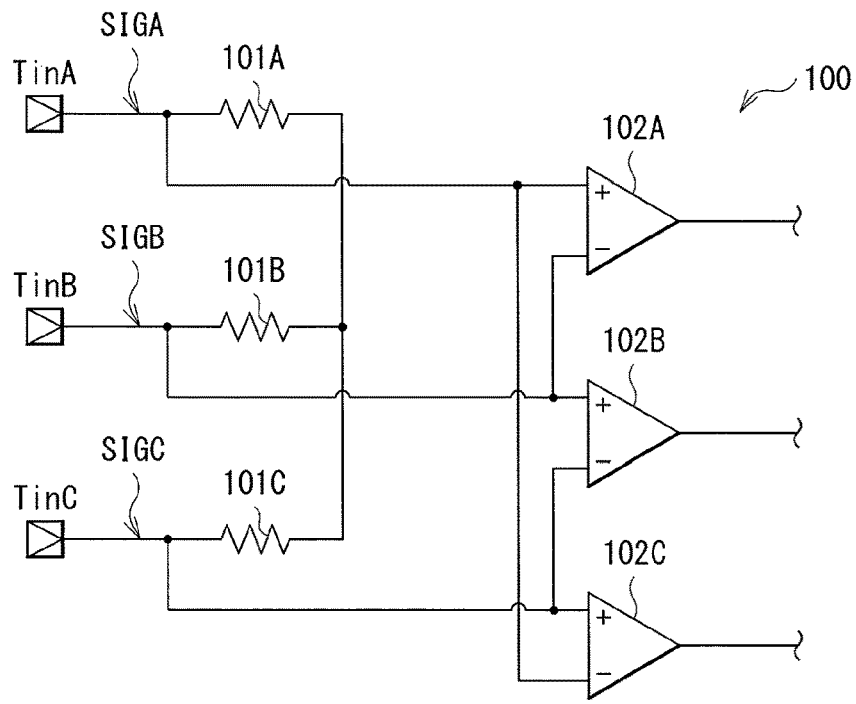
[ FIG. 6 ]
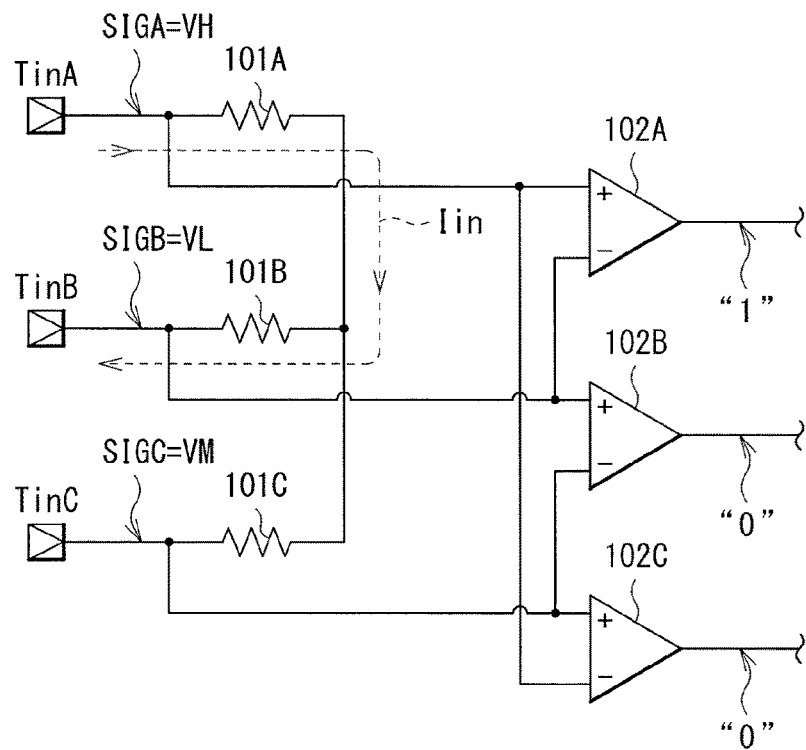

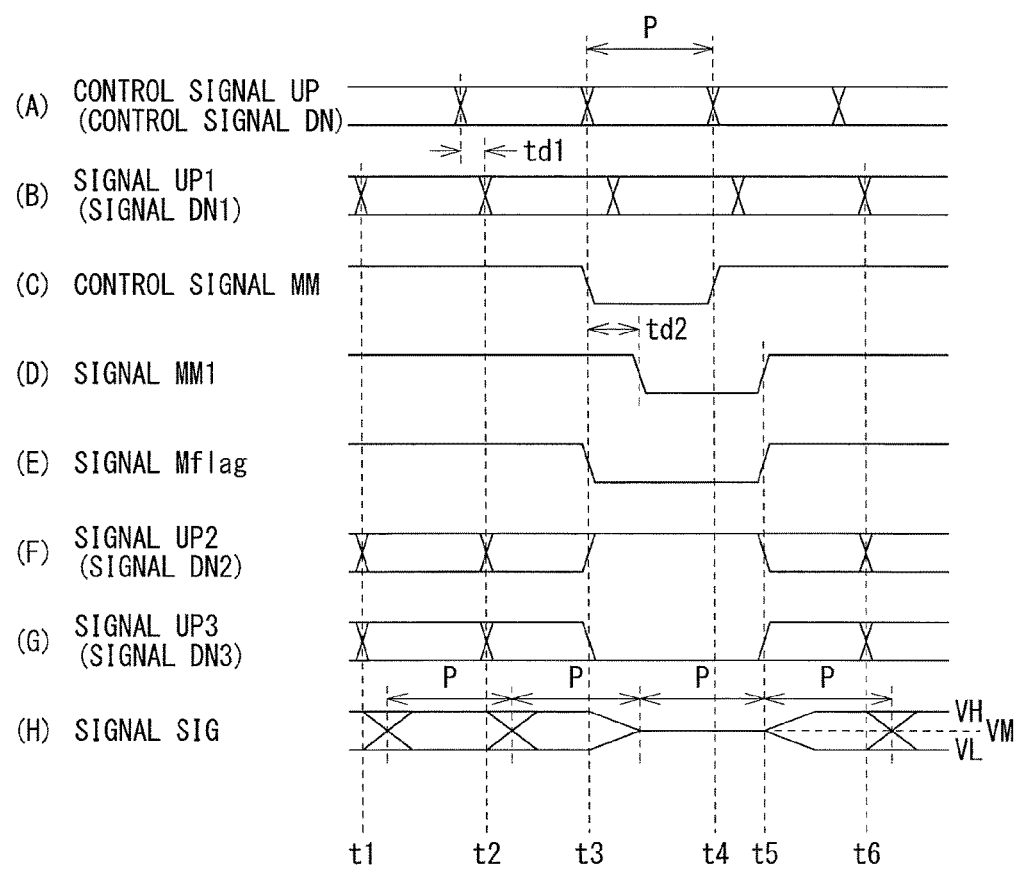
[ FIG. 7 ]

[ FIG. 8A ]
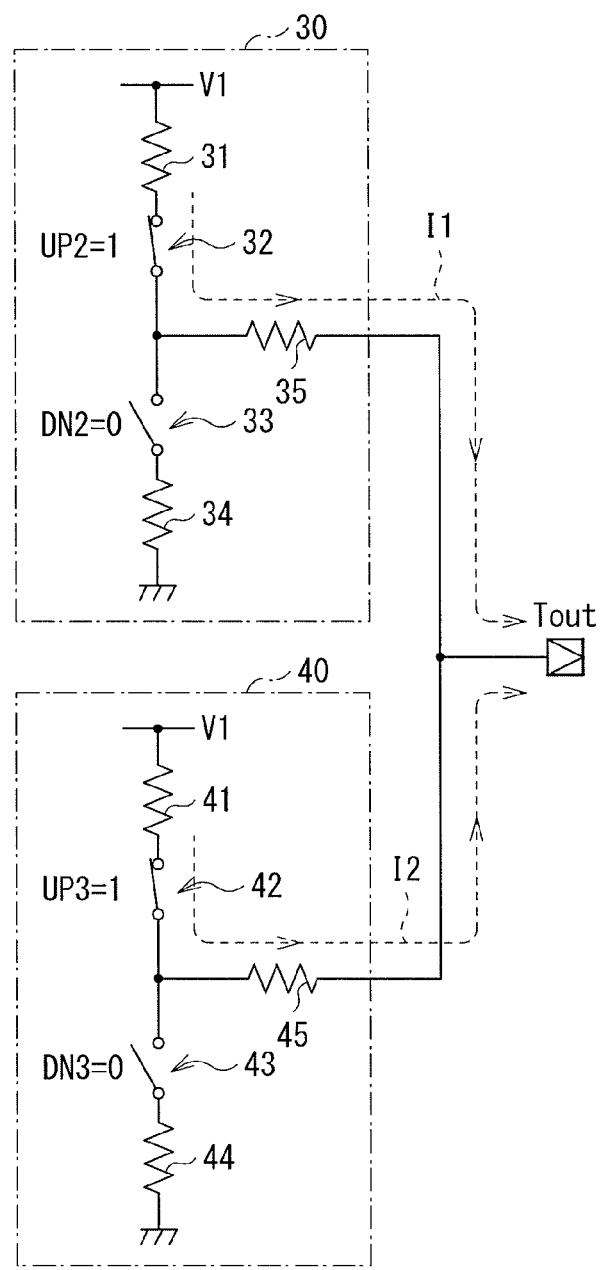

[ FIG. 8B ]
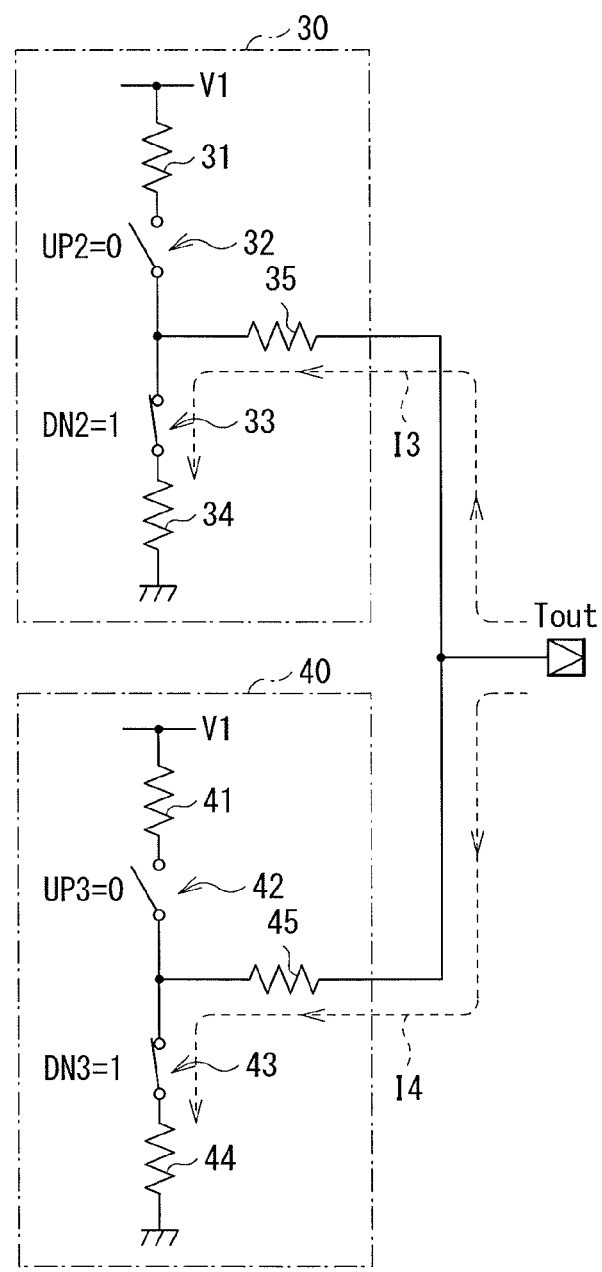

[ FIG. 8C ]
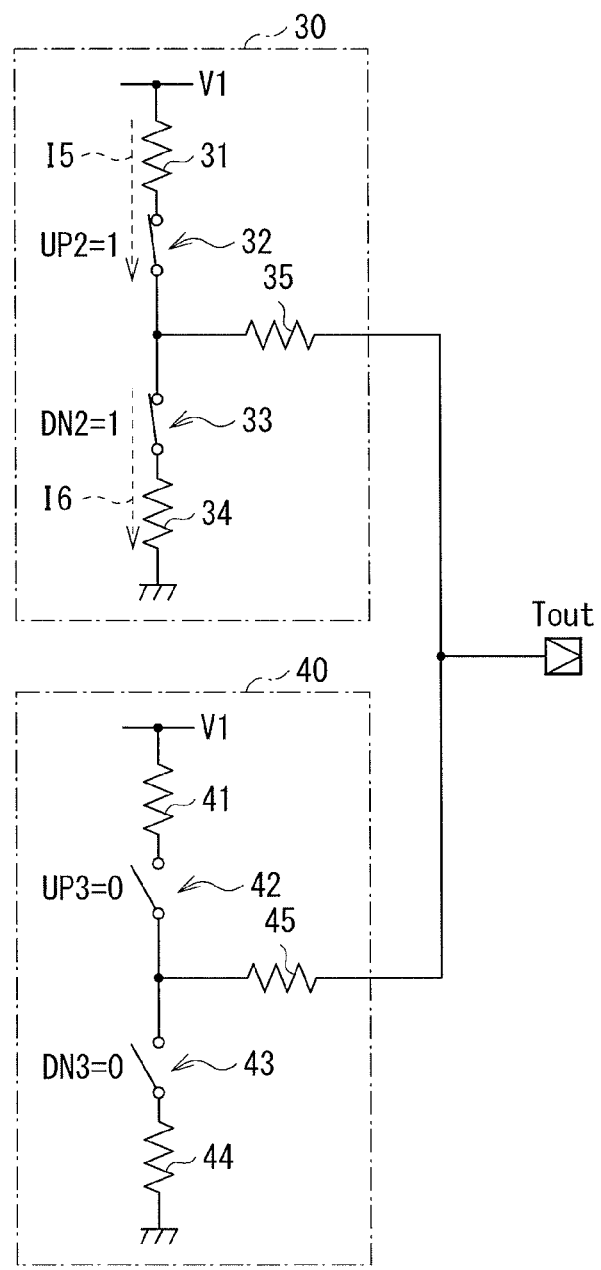

[ FIG. 9 ]
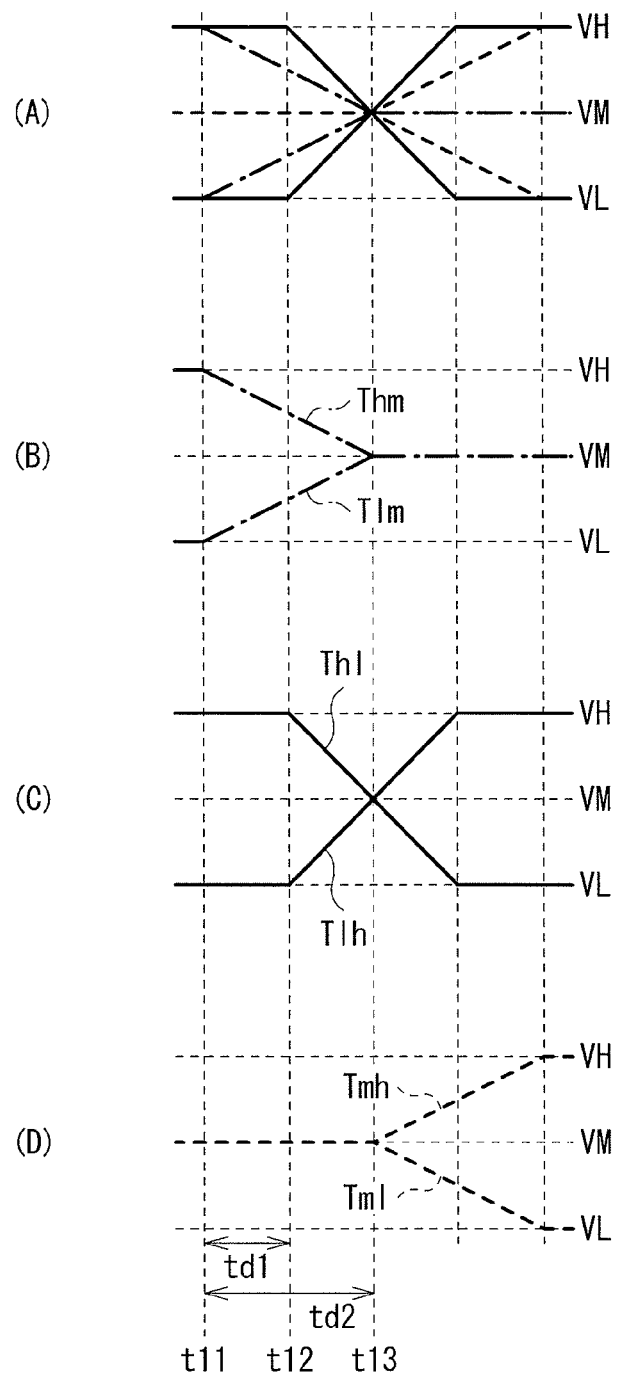

[ FIG. 10 ]
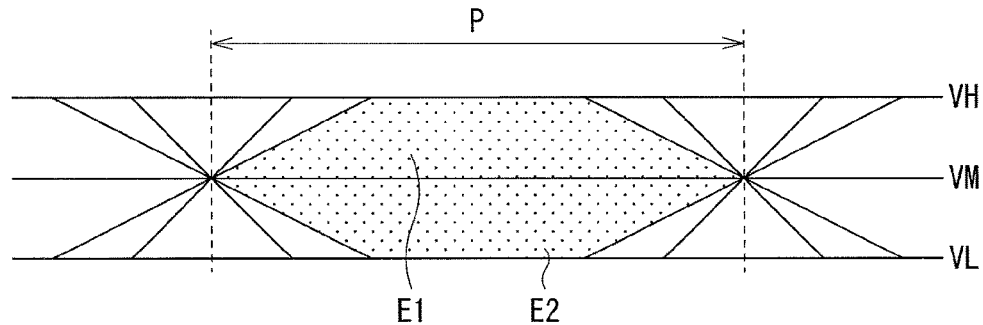
[ FIG. 11 ]
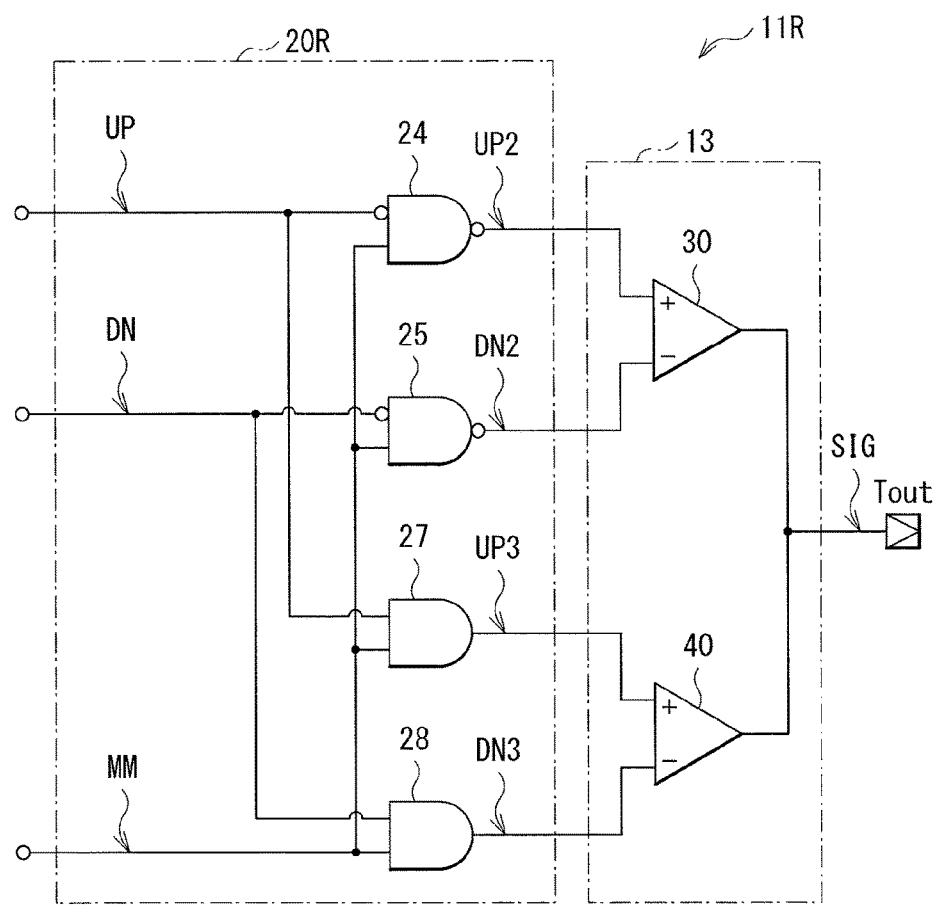

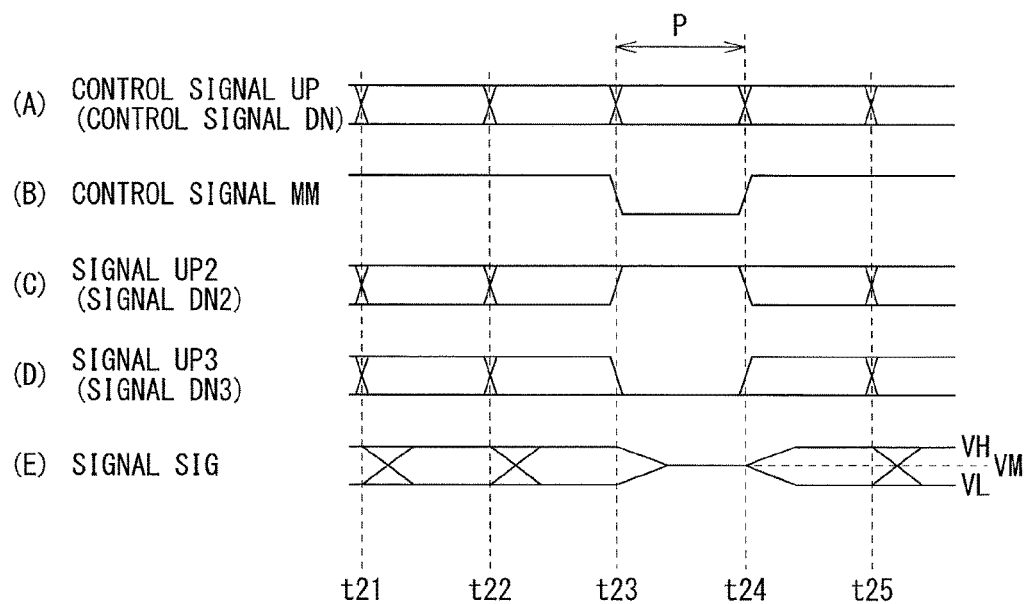
[FIG. 12]

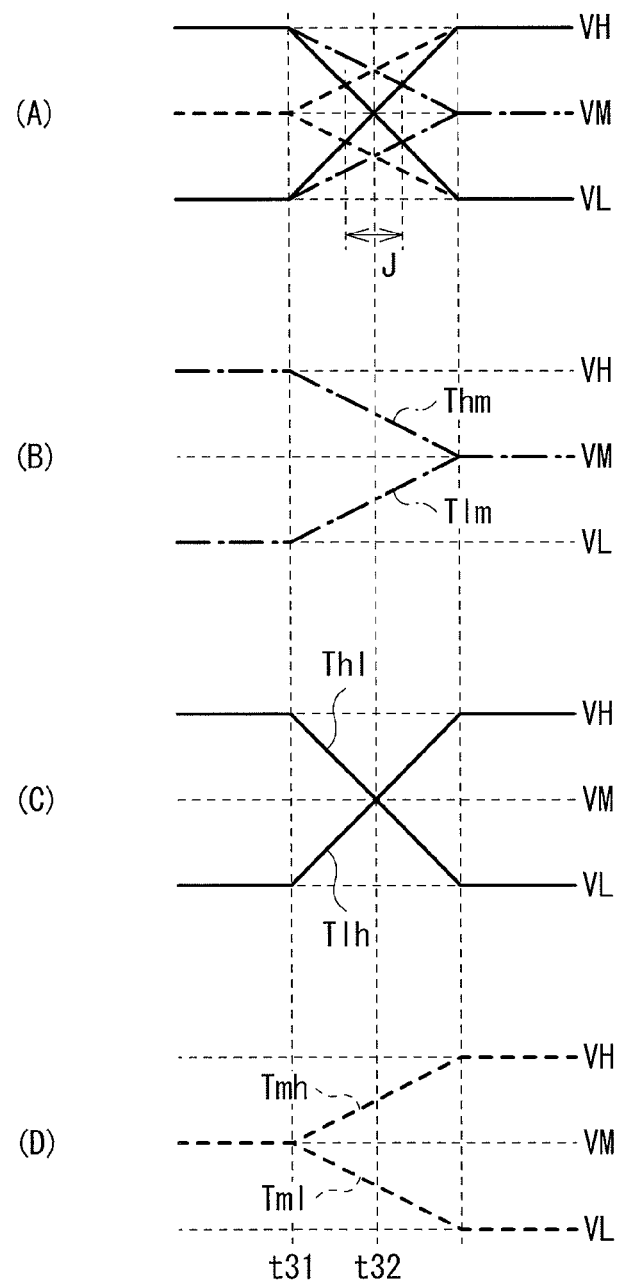
[ FIG. 13 ]

[ FIG. 14 ]
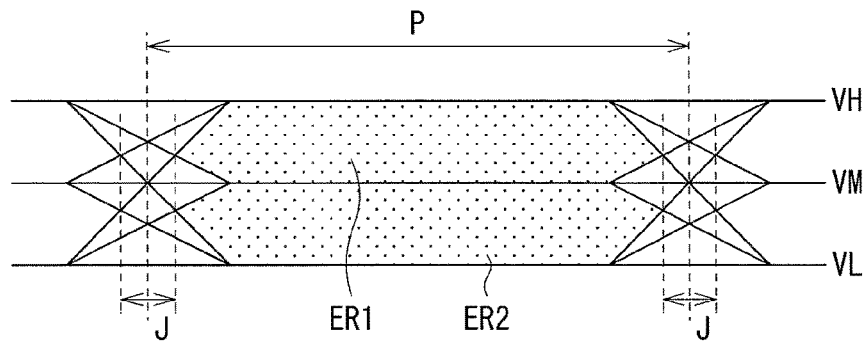
[ FIG. 15 ]
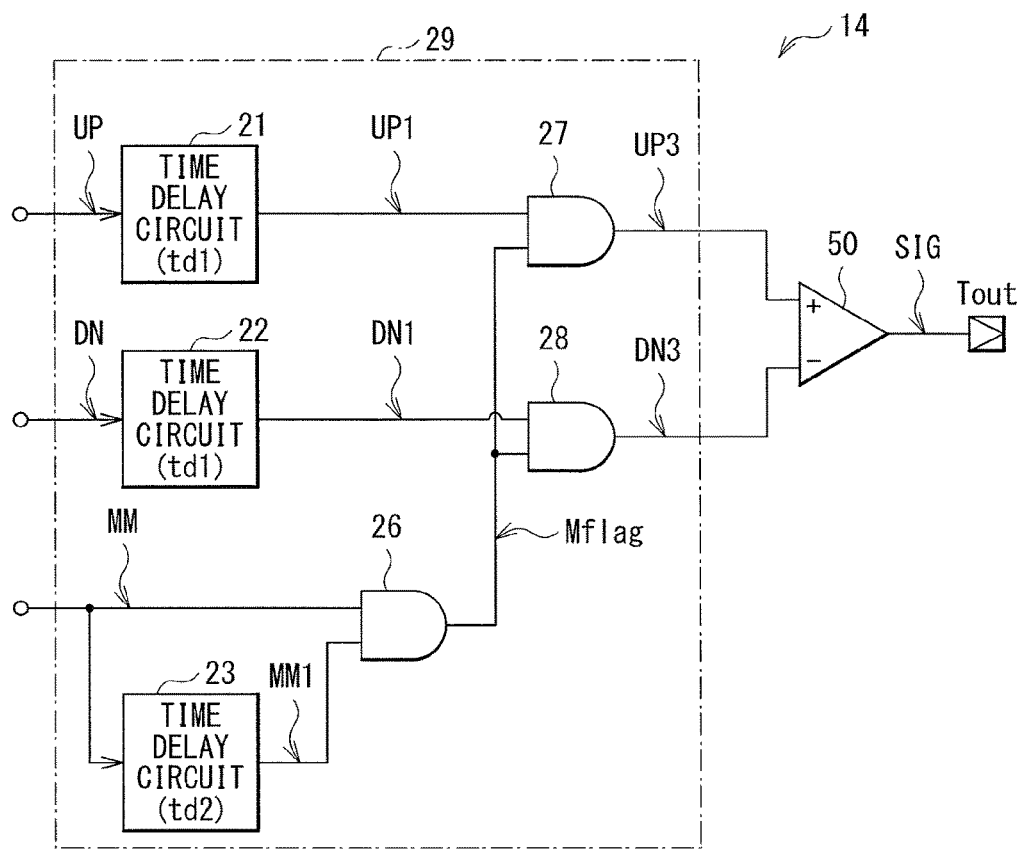

[ FIG. 16 ]
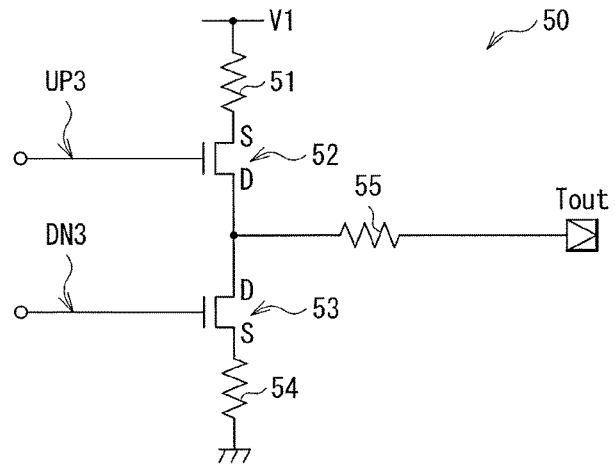
[ FIG. 17 ]
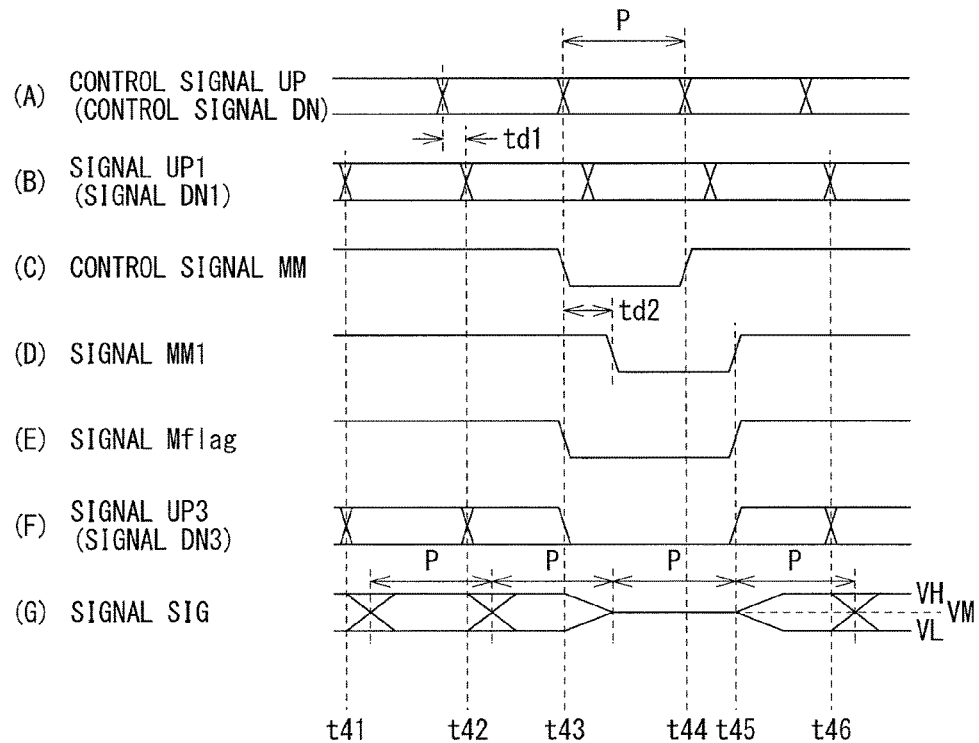

[ FIG. 18A ]
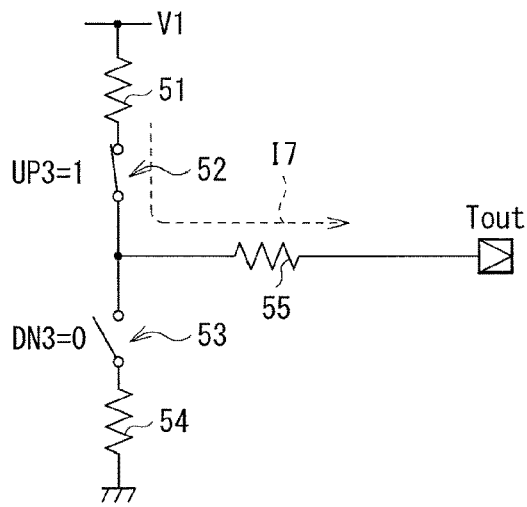
[ FIG. 18B ]
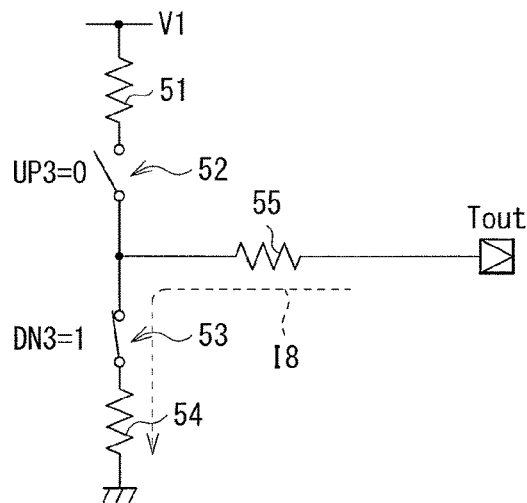
[ FIG. 18C ]
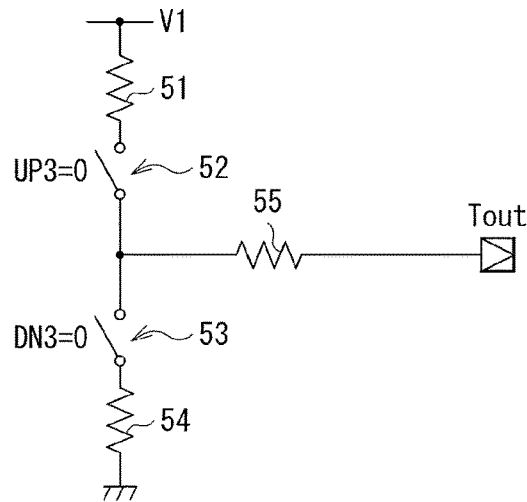

[ FIG. 19 ]
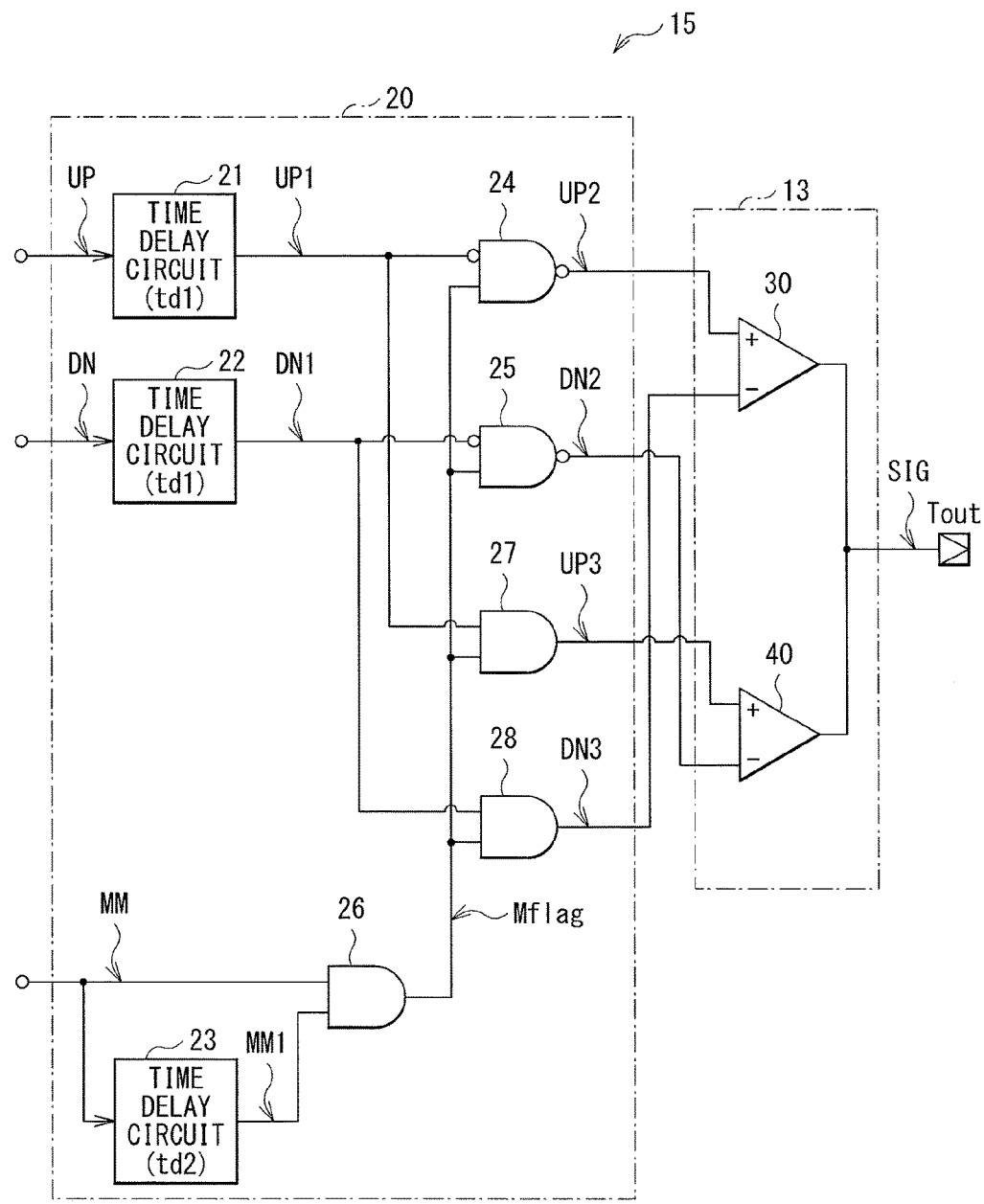

[ FIG. 20 ]
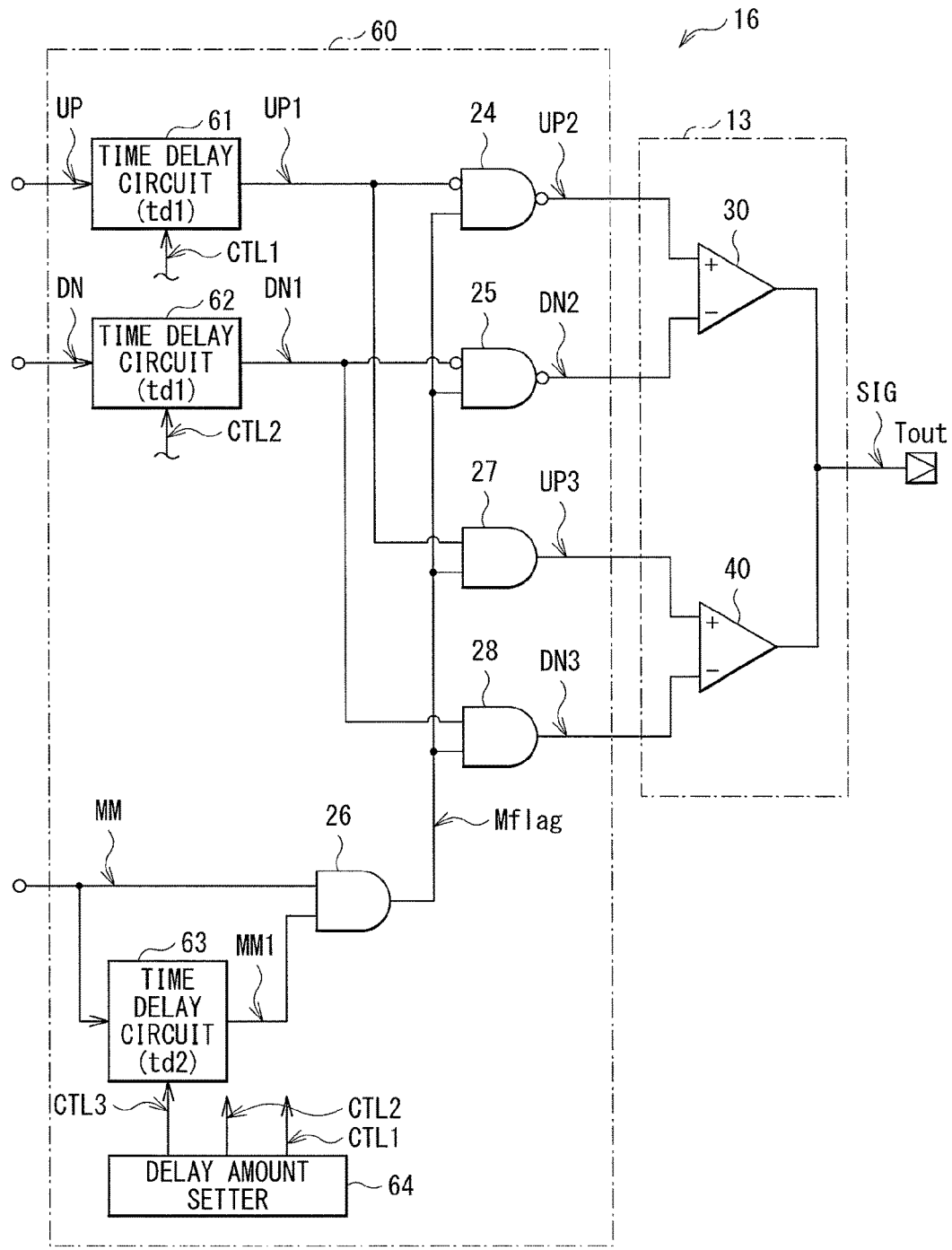

[ FIG. 21 ]
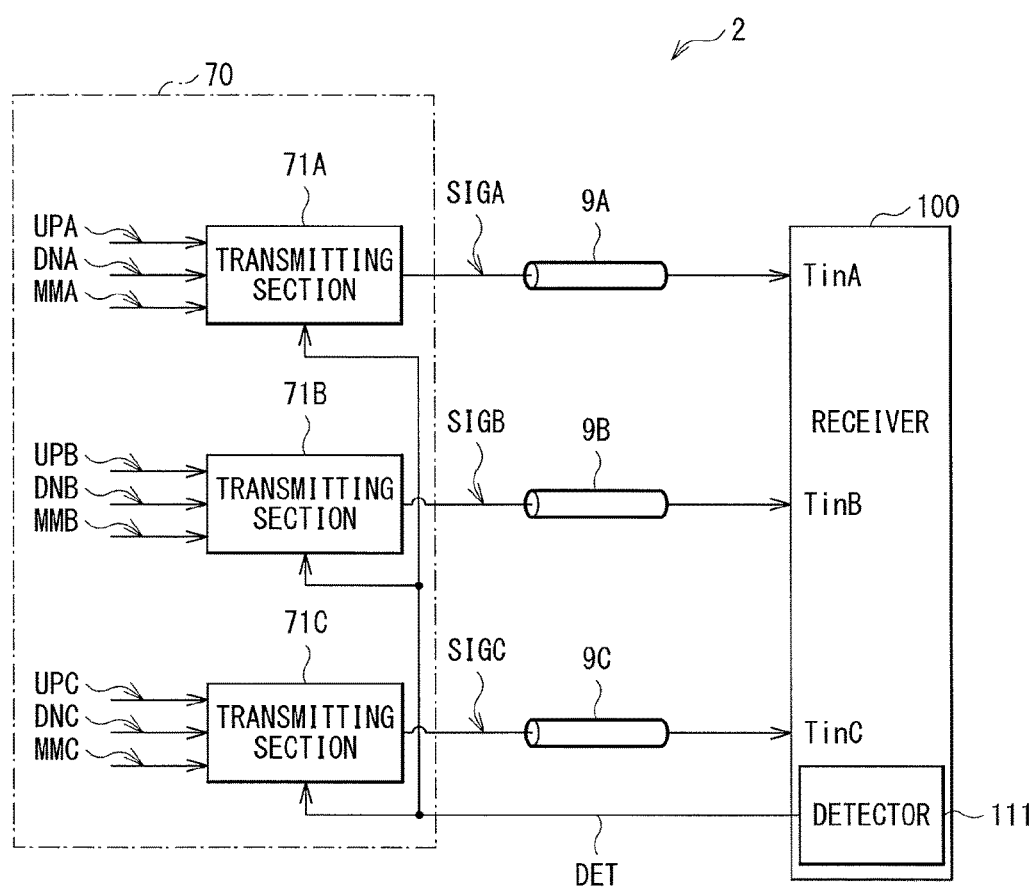

[ FIG. 22 ]
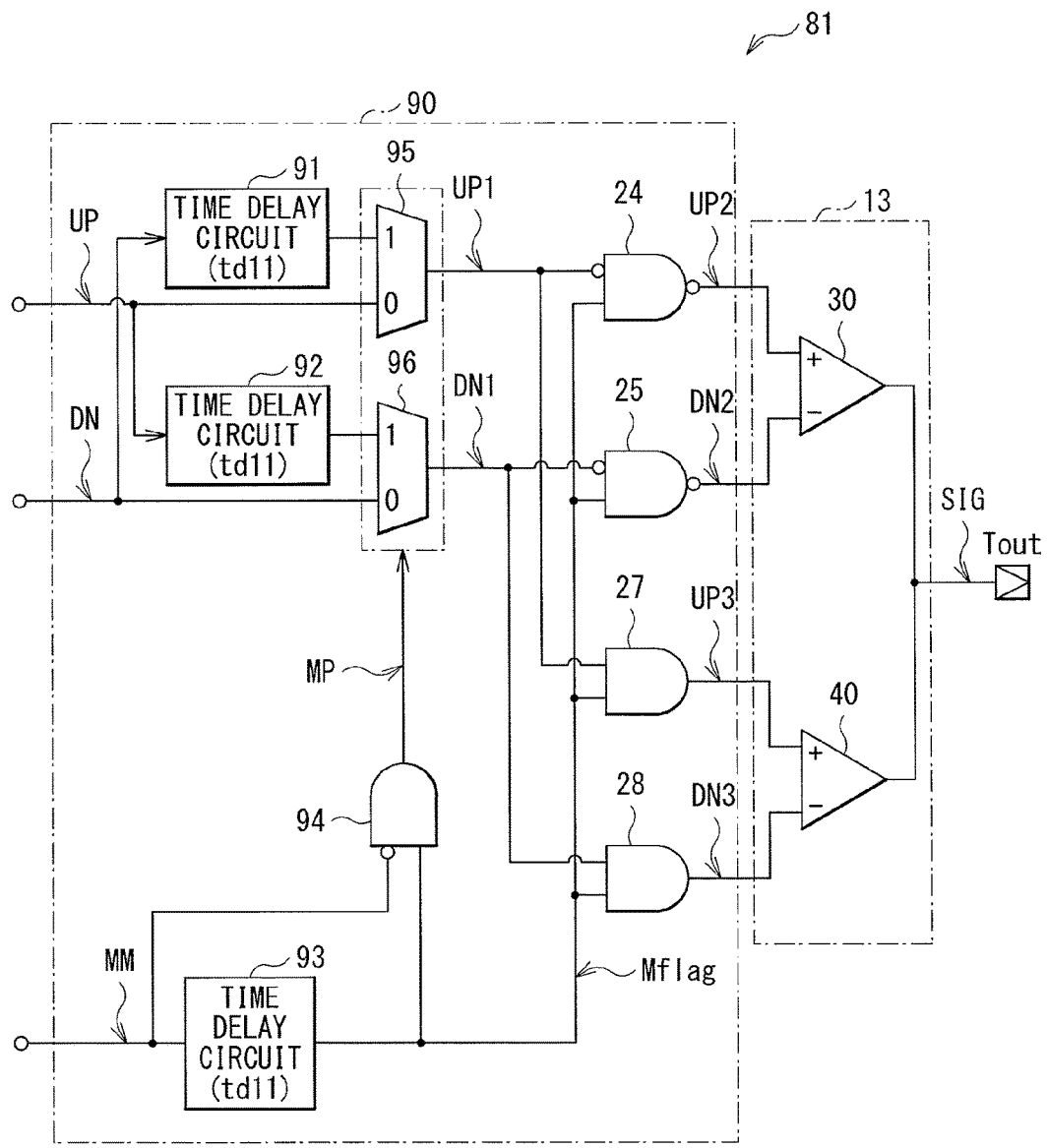

[ FIG. 23 ]
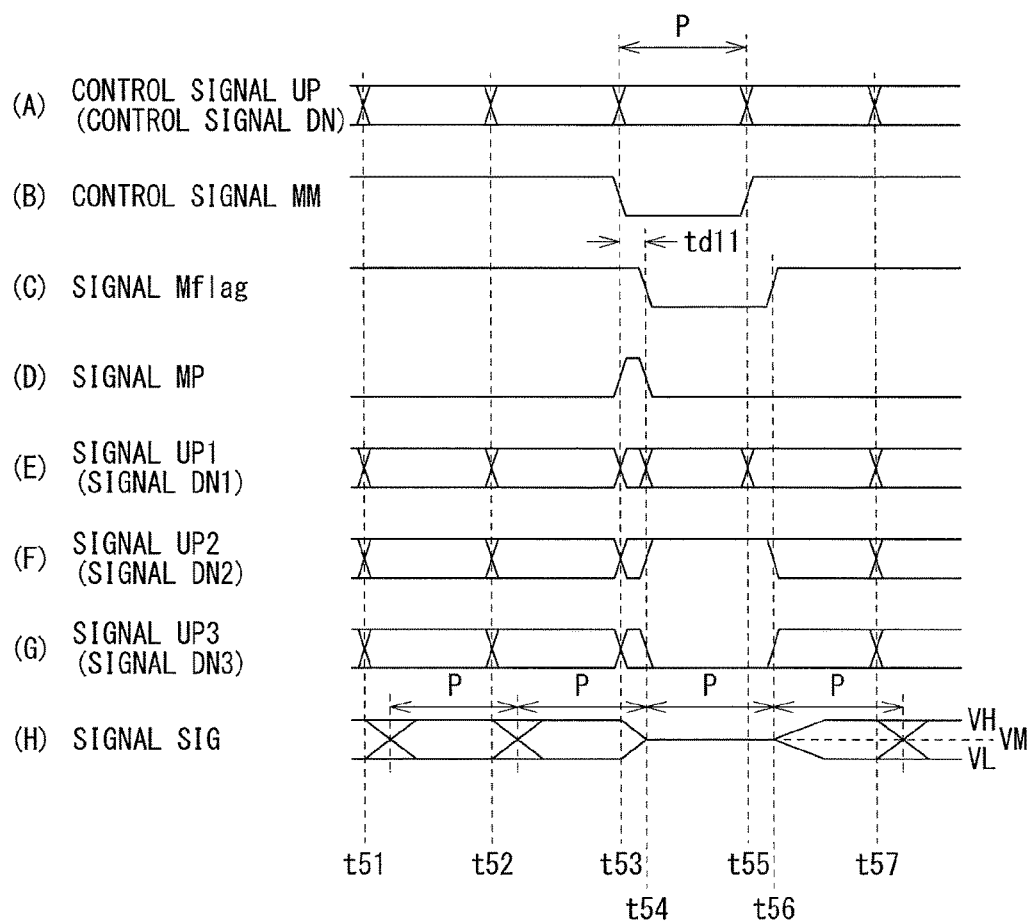

[ FIG. 24 ]
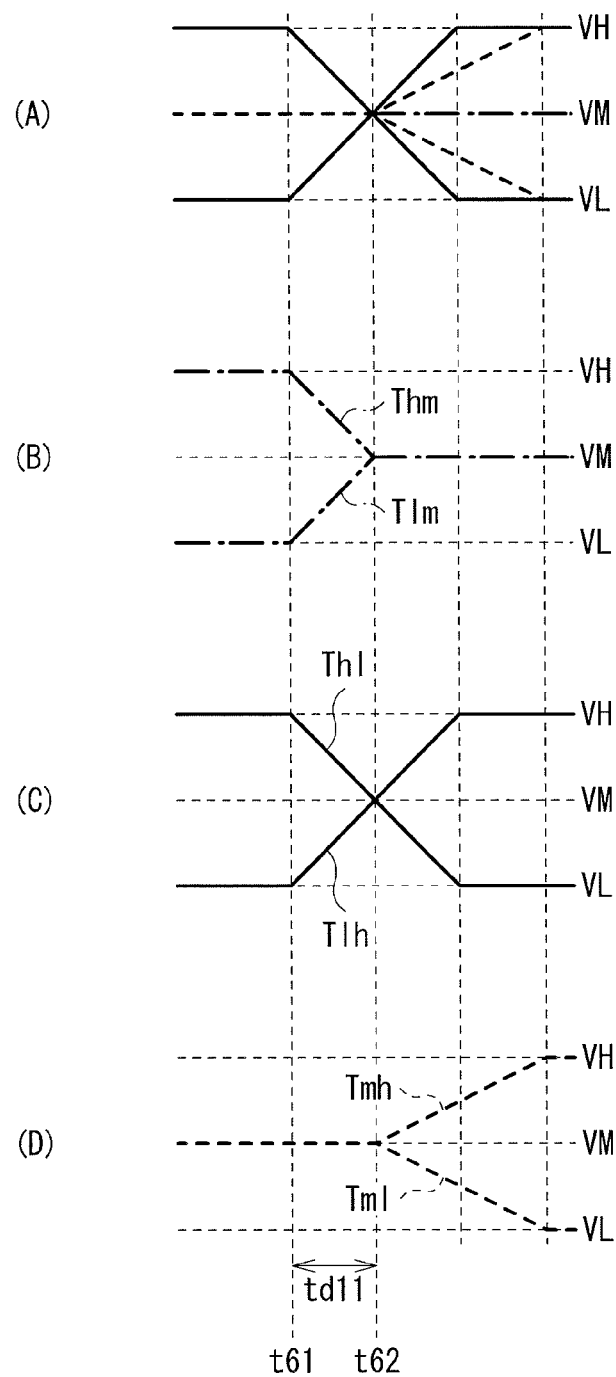

[ FIG. 25 ]
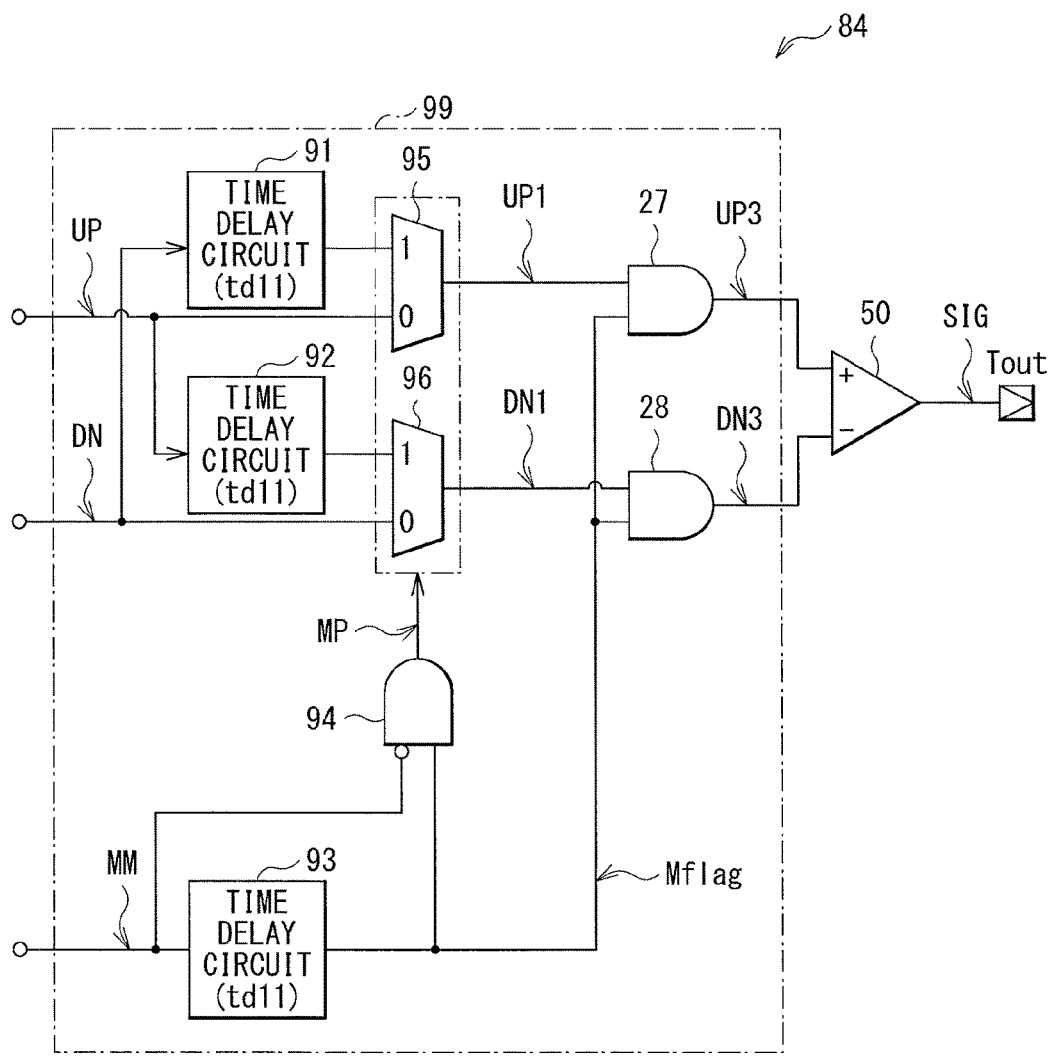

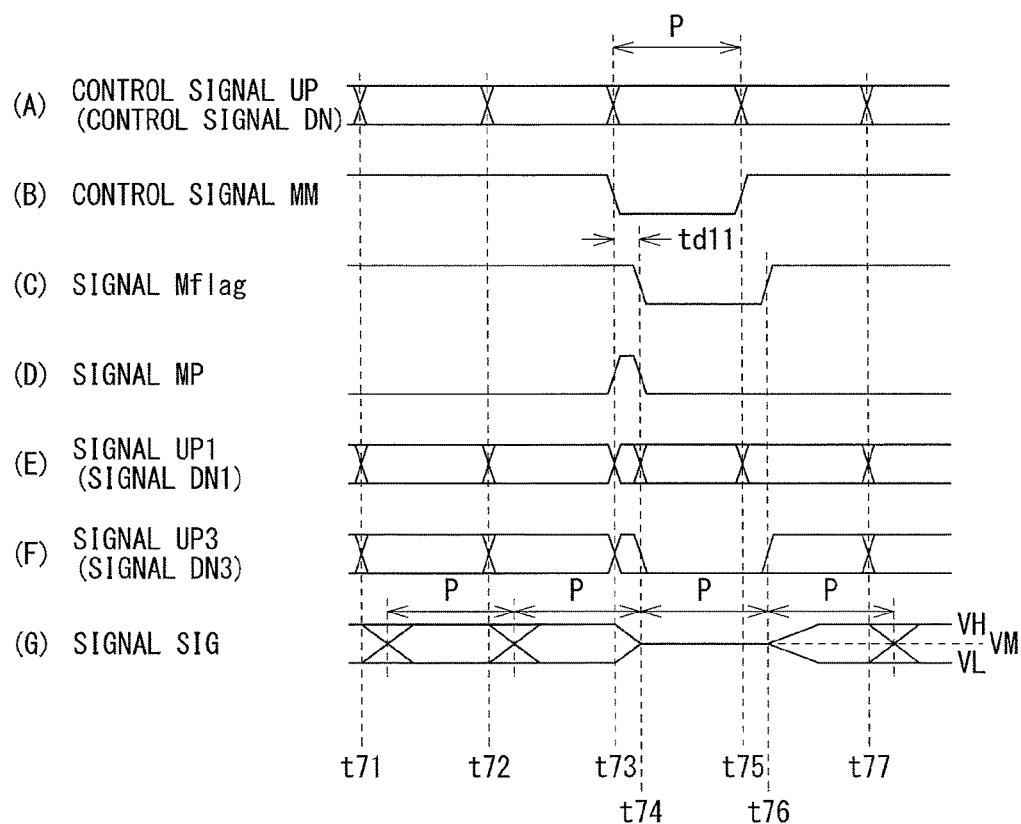
[ FIG. 26 ]

[ FIG. 27 ]
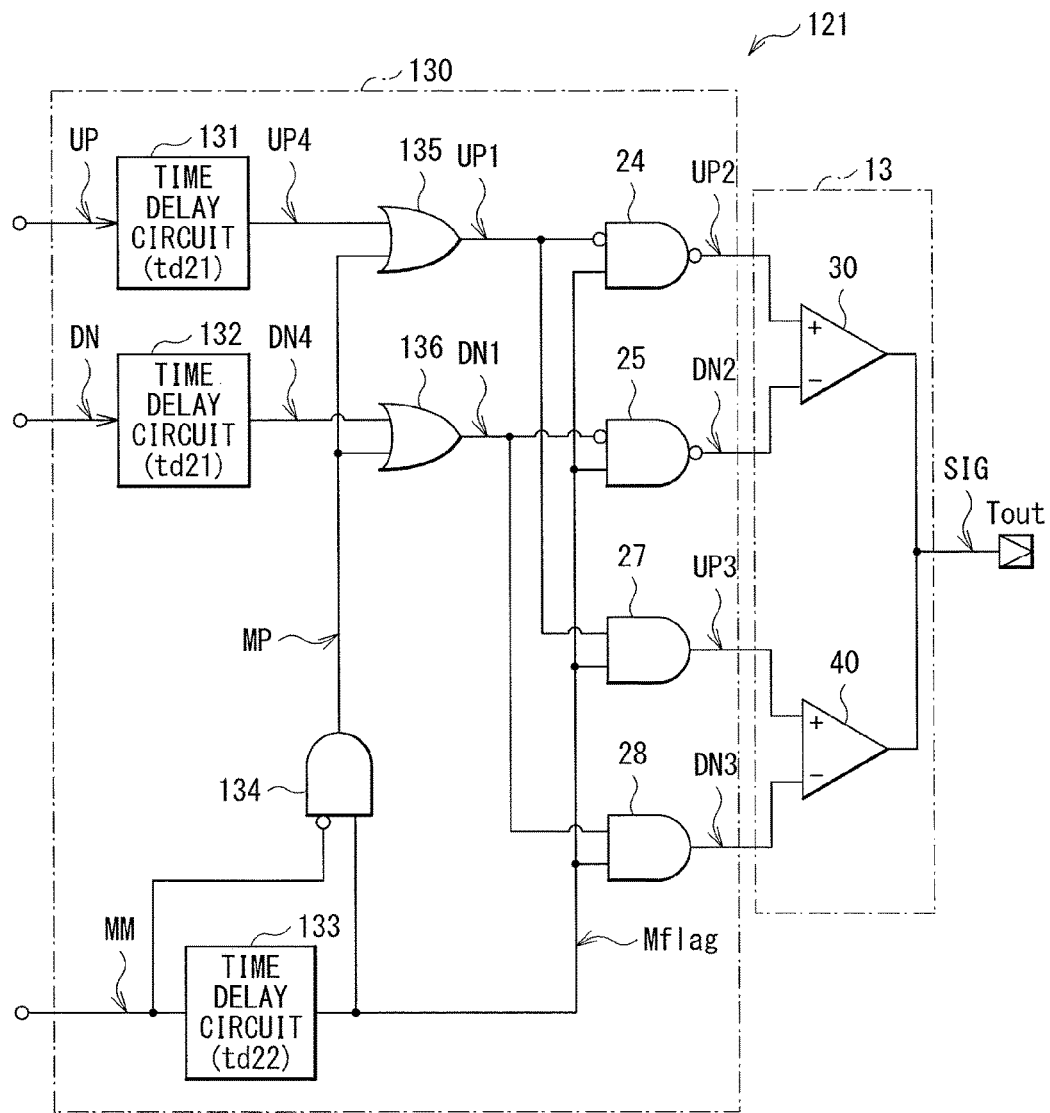

[ FIG. 28 ]
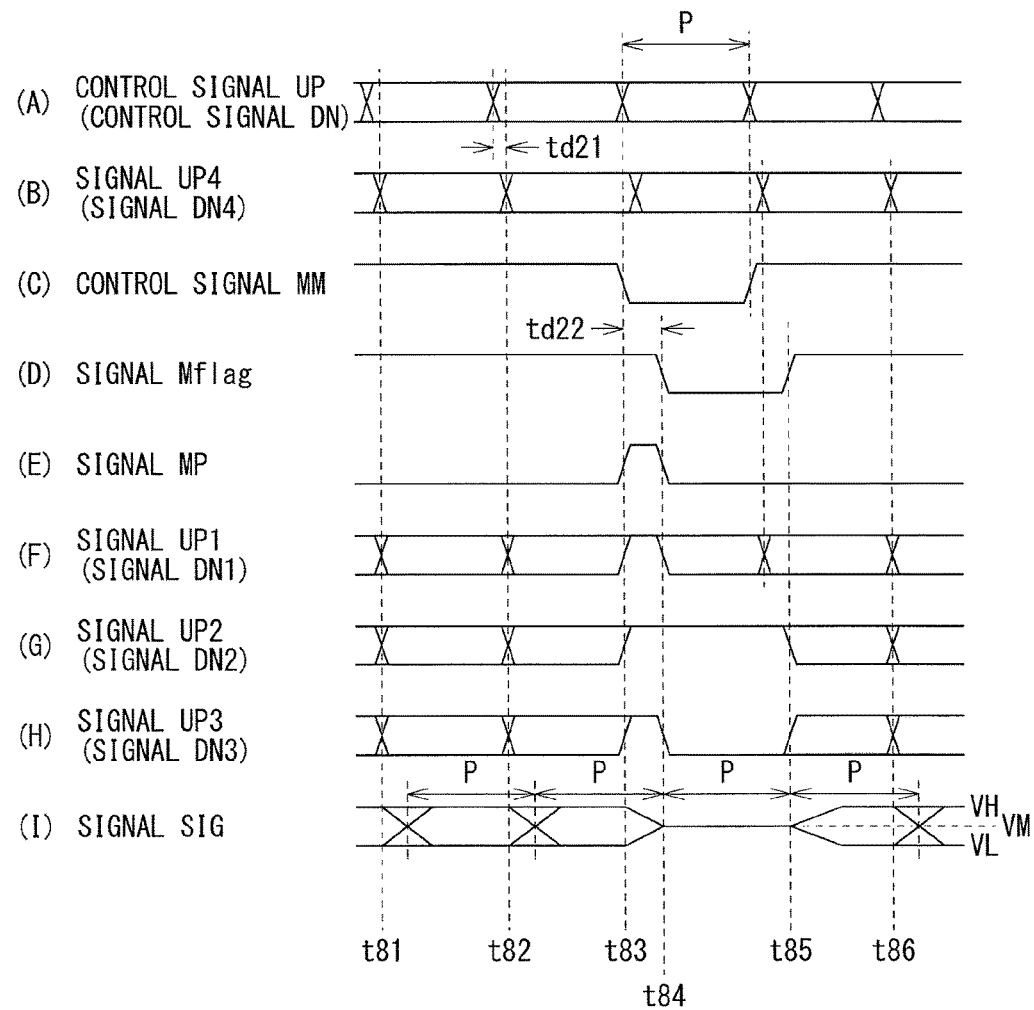

[ FIG. 29 ]
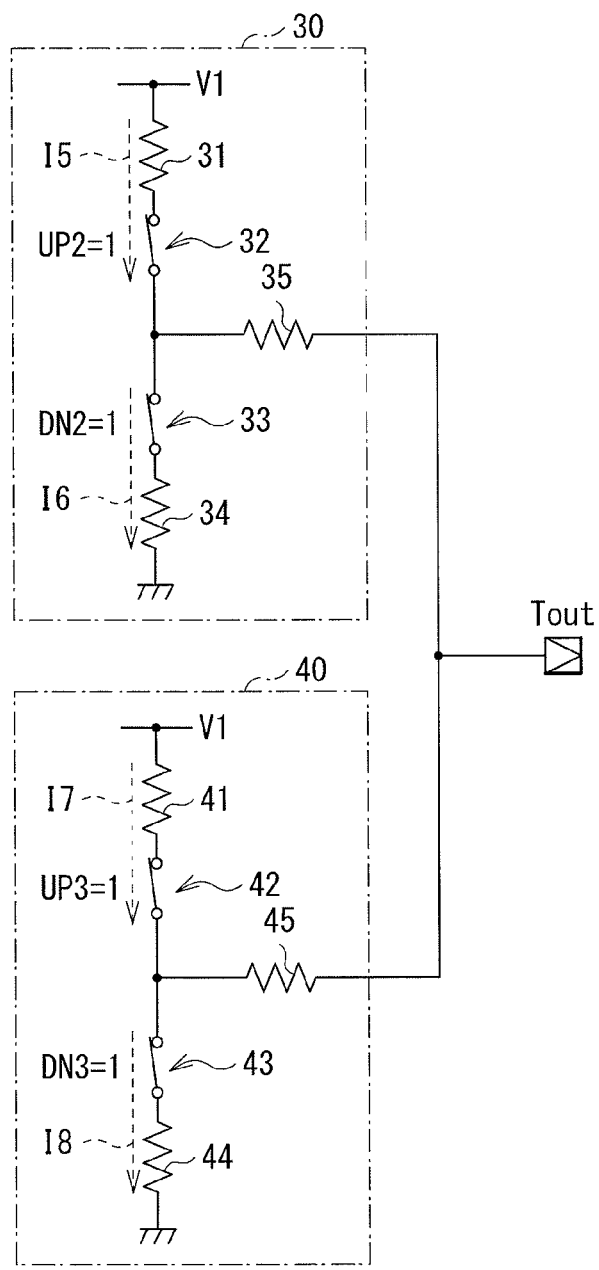

[ FIG. 30 ]
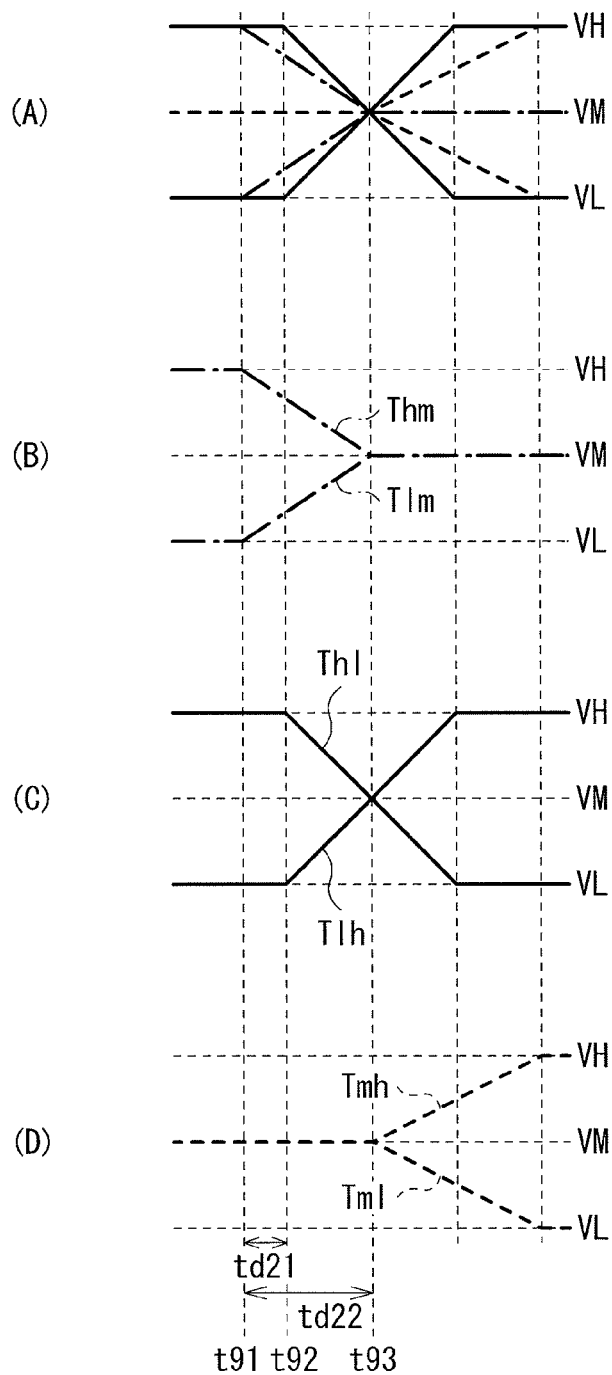

[ FIG. 31 ]
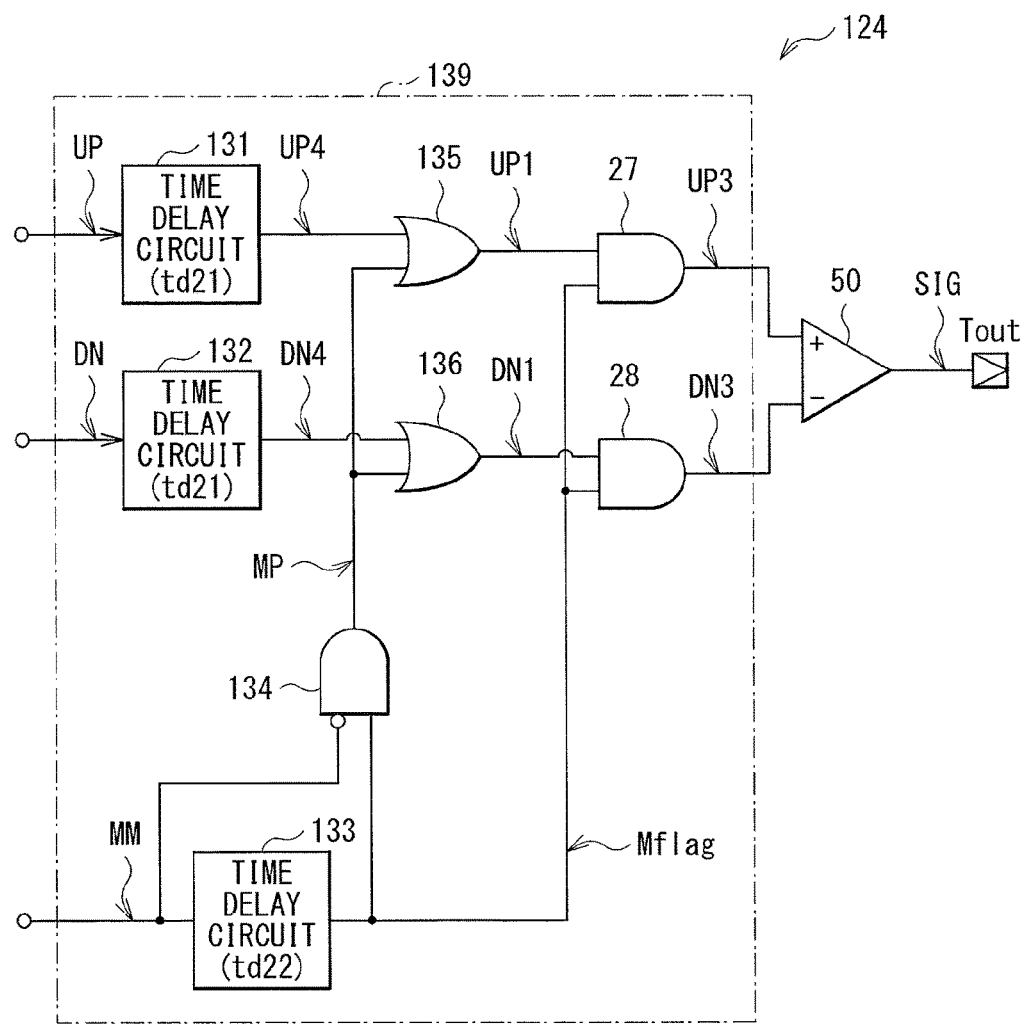

[ FIG. 32 ]
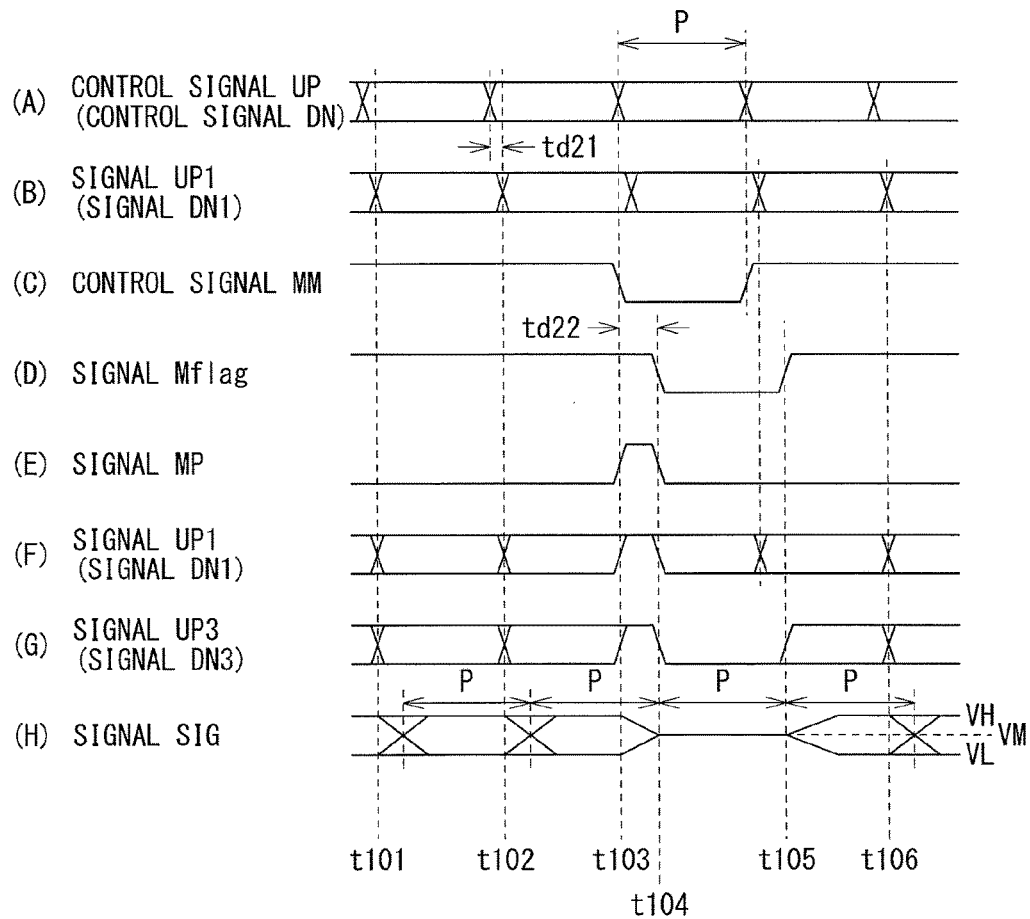
[ FIG. 33 ]
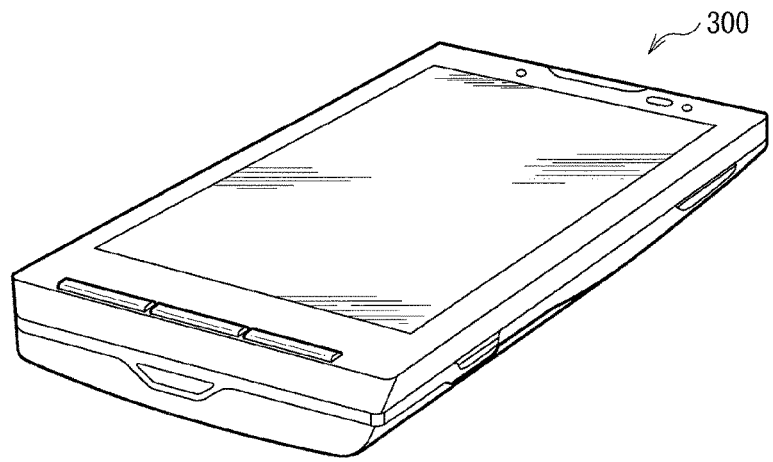

[ FIG.34 ]
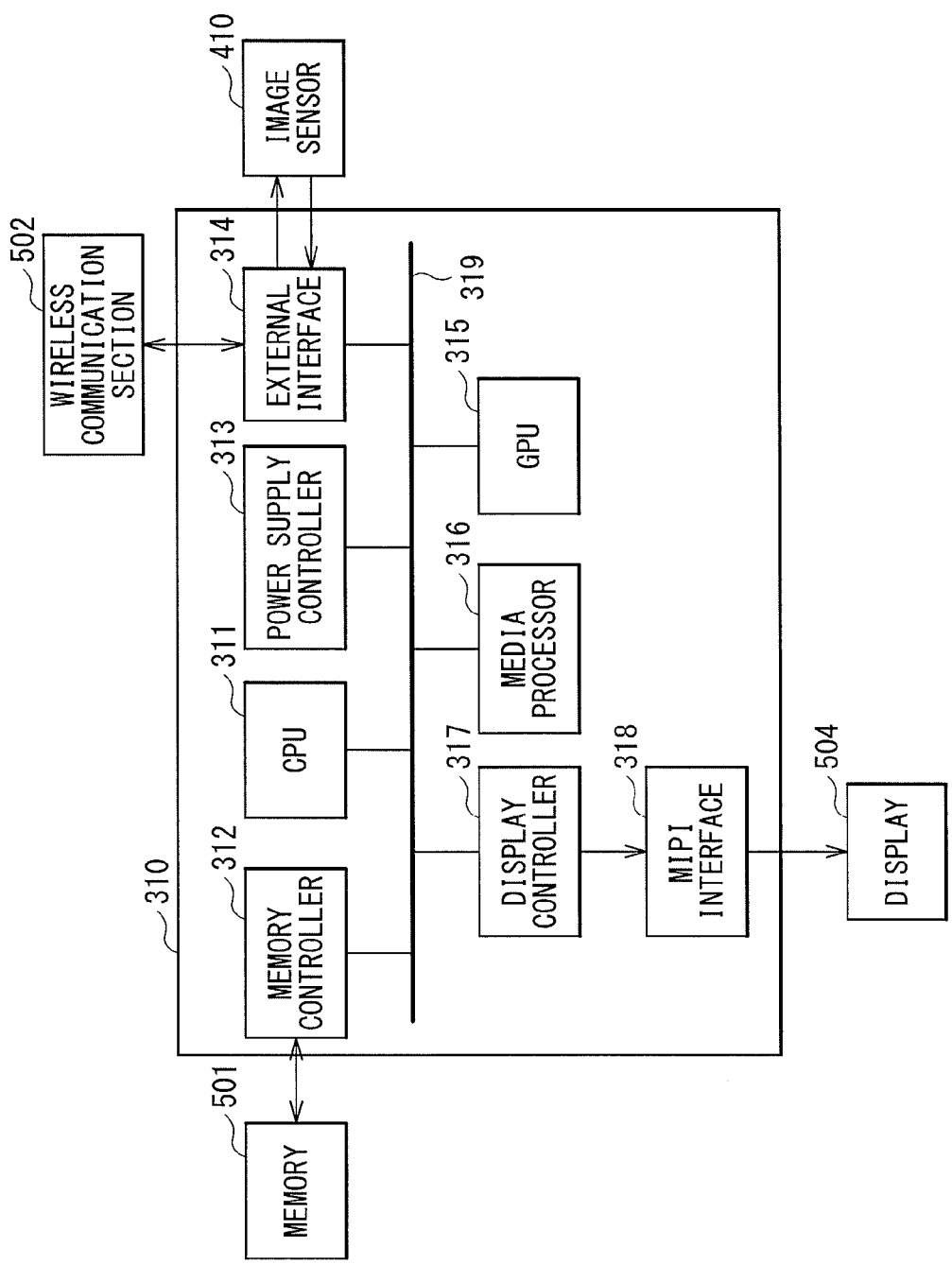

[ FIG. 35 ]
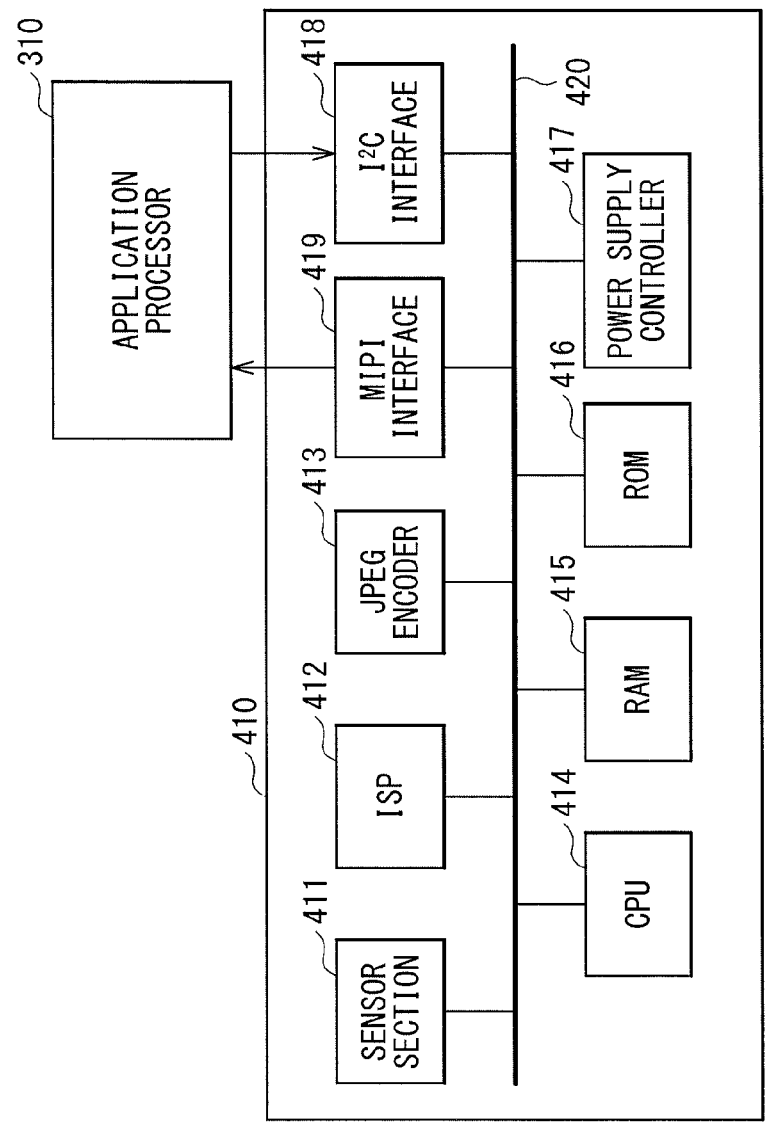

TRANSMITTER AND COMMUNICATION SYSTEM

TECHNICAL FIELD

The present disclosure relates to a transmitter that transmits signals, and a communication system provided with such a transmitter.

BACKGROUND ART

In association with highly-functional and multifunctional capabilities achieved in an electronic apparatus in recent years, a variety of devices such as semiconductor chips, sensors, and display devices have been built into the electronic apparatus. Large amounts of data have been exchanged to and from these devices, and the data amount has increased with advancing highly-functional and multifunctional capabilities of the electronic apparatus.

In regard to methods of communicating larger amounts of data, various technologies have been disclosed. For example, there have been disclosed communication systems that communicate data utilizing three voltage levels in PTL 1 and PTL 2.

CITATION LIST

Patent Literature

[PTL 1] Japanese Unexamined Patent Application Publication (Published Japanese Translation of PCT Application) No. JP2011-517159

[PTL 2] Japanese Unexamined Patent Application Publication (Published Japanese Translation of PCT Application) No. JP2010-520715

SUMMARY

Meanwhile, in a communication system, high communication quality is typically desired, and additional improvement of the communication quality is expected.

Accordingly, it is desirable to provide a transmitter and a communication system that makes it possible to improve communication quality.

A transmitter according to an embodiment of the present disclosure includes an output terminal, a driver, and a controller. The driver performs transition of a voltage of the output terminal among a plurality of voltages. The controller controls the driver to cause transition start timing in one voltage transition in voltage transition among the plurality of voltages to be later than transition start timing in another voltage transition.

A communication system according to an embodiment of the present disclosure includes a transmitter and a receiver. The transmitter has an output terminal, a driver, and a controller. The driver performs transition of a voltage of the output terminal among a plurality of voltages. The controller controls the driver to cause transition start timing in one voltage transition in voltage transition among the plurality of voltages to be later than transition start timing in another voltage transition.

In the transmitter and the communication system according to the respective embodiments of the present disclosure, the voltage of the output terminal transits among a plurality of voltages. At this time, control is performed to cause transition start timing in one voltage transition to be later than transition start timing in another voltage transition.

According to the transmitter and the communication system according to the respective embodiments of the present disclosure, transition start timing in one voltage transition is later than transition start timing in another voltage transition, and therefore it is possible to improve communication quality. It is to be noted that effects described here are non-limiting, and effects achieved by the technology may be one or more of effects described in the present disclosure.

BRIEF DESCRIPTION OF DRAWINGS

FIG. 1 is a block diagram illustrating a configuration example of a communication system according to an embodiment of the present disclosure.

FIG. 2 is a block diagram illustrating a configuration example of a transmitting section according to a first embodiment.

FIG. 3 is a circuit diagram illustrating a configuration example of a driver illustrated in FIG. 2.

FIG. 4 is a table illustrating an operation example of the transmitting section illustrated in FIG. 2.

FIG. 5 is a circuit diagram illustrating a configuration example of a receiver illustrated in FIG. 1.

FIG. 6 is an explanatory diagram illustrating an operation example of the receiver illustrated in FIG. 1.

FIG. 7 is a timing waveform diagram illustrating an operation example of the transmitting section illustrated in FIG. 2.

FIG. 8A is an explanatory diagram illustrating an operation example of the driver illustrated in FIG. 3.

FIG. 8B is an explanatory diagram illustrating another operation example of the driver illustrated in FIG. 3.

FIG. 8C is an explanatory diagram illustrating another operation example of the driver illustrated in FIG. 3.

FIG. 9 is an explanatory diagram illustrating an operation example of the transmitting section illustrated in FIG. 2.

FIG. 10 is an eye diagram illustrating an operation example of the transmitting section illustrated in FIG. 2.

FIG. 11 is a block diagram illustrating a configuration example of a transmitting section according to a comparative example.

FIG. 12 is a timing waveform diagram illustrating an operation example of the transmitting section illustrated in FIG. 11.

FIG. 13 is an explanatory diagram illustrating an operation example of the transmitting section illustrated in FIG. 11.

FIG. 14 is an eye diagram illustrating an operation example of the transmitting section illustrated in FIG. 11.

FIG. 15 is a block diagram illustrating a configuration example of a transmitting section according to a modification example of the first embodiment.

FIG. 16 is a circuit diagram illustrating a configuration example of a driver circuit illustrated in FIG. 15.

FIG. 17 is a timing waveform diagram illustrating an operation example of a transmitting section illustrated in FIG. 15.

FIG. 18A is an explanatory diagram illustrating an operation example of the driver circuit illustrated in FIG. 16.

FIG. 18B is an explanatory diagram illustrating another operation example of the driver circuit illustrated in FIG. 16.

FIG. 18C is an explanatory diagram illustrating another operation example of the driver circuit illustrated in FIG. 16.

FIG. 19 is a block diagram illustrating a configuration example of a transmitting section according to another modification example of the first embodiment.

FIG. 20 is a block diagram illustrating a configuration example of a transmitting section according to another modification example of the first embodiment.

FIG. 21 is a block diagram illustrating a configuration example of a communication system according to another modification example of the first embodiment.

FIG. 22 is a block diagram illustrating a configuration example of a transmitting section according to a second embodiment.

FIG. 23 is a timing waveform diagram illustrating an operation example of the transmitting section illustrated in FIG. 22.

FIG. 24 is an explanatory diagram illustrating an operation example of the transmitting section illustrated in FIG. 22.

FIG. 25 is a block diagram illustrating a configuration example of a transmitting section according to a modification example of the second embodiment.

FIG. 26 is a timing waveform diagram illustrating an operation example of the transmitting section illustrated in FIG. 25.

FIG. 27 is a block diagram illustrating a configuration example of a transmitting section according to a third embodiment.

FIG. 28 is a timing waveform diagram illustrating an operation example of the transmitting section illustrated in FIG. 27.

FIG. 29 is an explanatory diagram illustrating an operation example of a driver illustrated in FIG. 27.

FIG. 30 is an explanatory diagram illustrating an operation example of the transmitting section illustrated in FIG. 27.

FIG. 31 is a block diagram illustrating a configuration example of a transmitting section according to a modification example of the third embodiment.

FIG. 32 is a timing waveform diagram illustrating an operation example of the transmitting section illustrated in FIG. 31.

FIG. 33 is a perspective view of an external appearance configuration of a smartphone to which a transmitter according to any of the above-described embodiments is applied.

FIG. 34 is a block diagram illustrating a configuration example of an application processor to which the transmitter according to any of the above-described embodiments is applied.

FIG. 35 is a block diagram illustrating a configuration example of an image sensor to which the transmitter according to any of the above-described embodiments is applied.

EMBODIMENTS FOR CARRYING OUT THE INVENTION

Hereinafter, some embodiments of the present disclosure will be described in detail with reference to the drawings. It is to be noted that description will be given in the following order.

1. First Embodiment
2. Second Embodiment
3. Third Embodiment
4. Application Examples
1. <First Embodiment>

[Configuration Examples]

FIG. 1 illustrates a configuration example of a communication system to which a transmitter according to a first embodiment of the present disclosure is applied. A communication system 1 performs communication using signals having three voltage levels. The communication system 1 includes a transmitter 10 and a receiver 100.

The transmitter 10 has transmitting sections 11A, 11B, and 11C. The transmitting section 11A generates a signal SIGA on the basis of control signals UPA, DNA, and MMA to transmit the signal SIGA to the receiver 100 via a transmission line 9A. Similarly, the transmitting section 11B generates a signal SIGB on the basis of control signals UPB, DNB, and MMB to transmit the signal SIGB to the receiver 100 via a transmission line 9B, and the transmitting section 11C generates a signal SIGC on the basis of control signals UPC, DNC, and MMC to transmit the signal SIGC to the receiver 100 via a transmission line 9C. A characteristic impedance of each of the transmission lines 9A to 9B may be 50 [Ω] in this example.

It is to be noted that a transmitting section 11 is hereinafter used as appropriate as a section representing any of the transmitting sections 11A, 11B, and 11C. Likewise, a control signal UP is used as appropriate as a signal representing any of the control signals UPA, UPB, and UPC; a control signal DN is used as appropriate as a signal representing any of the control signals DNA, DNB, and DNC; a control signal MM is used as appropriate as a signal representing any of the control signals MMA, MMB, and MMC; and a signal SIG is used as appropriate as a signal representing any of the control signals SIGA, SIGB, and SIGC.

FIG. 2 illustrates a configuration example of the transmitting section 11. The transmitting section 11 has a controller 20 and a driver 13.

The controller 20 generates signals UP2, DN2, UP3, and DN3 on the basis of the control signals UP, DN, and MM. The controller 20 has time delay circuits 21 to 23, logic circuits 24 and 25, and AND circuits 26 to 28.

The time delay circuit 21 delays the control signal UP by a delay amount td1, and outputs such a delayed control signal UP as a signal UP1. The time delay circuit 22 delays the control signal DN by the delay amount td1, and outputs such a delayed control signal DN as a signal DN1. More specifically, the delay amount of the time delay circuit 21 is same as that of the time delay circuit 22. The time delay circuit 23 delays the control signal MM by a delay amount td2, and outputs such a delayed control signal MM as a signal MM1. The delay amount td2 of the time delay circuit 23 is greater than the delay amount td1 specified in the time delay circuits 21 and 22 (td2>td1). As described hereinafter, each of the delay amounts of these time delay circuits 21 to 23 is intended to set start timing of every transition for the signal SIG.

The AND circuit 26 calculates the logical AND of the control signal MM and the signal MM1, and outputs a result as a signal Mflag. The logic circuit 24 calculates the negative AND of an inverse signal of the signal UP1 and the signal Mflag, and outputs a result as the signal UP2. The logic circuit 25 calculates the negative AND of an inverse signal of the signal DN1 and the signal Mflag, and outputs a result as the signal DN2. The AND circuit 27 calculates the logical AND of the signal UP1 and the signal Mflag, and outputs a result as the signal UP3. The AND circuit 28 calculates the logical AND of the signal DN1 and the signal Mflag, and outputs a result as the signal DN3.

The driver 13 generates the signal SIG on the basis of the signals UP2, DN2, UP3, and DN3. The driver 13 has driver circuits 30 and 40. The signal UP2 is inputted to a positive input terminal of the driver circuit 30, while the signal DN2 is inputted to a negative input terminal, and an output terminal is coupled to an output terminal of the driver circuit 40 and an output terminal Tout of the transmitting section 11.

The signal UP3 is inputted to a positive input terminal of the driver circuit 40, while the signal DN3 is inputted to a negative input terminal, and an output terminal is coupled to the output terminal of the driver circuit 30 and the output terminal Tout.

FIG. 3 illustrates a configuration example of the driver 13. The driver circuit 30 has transistors 32 and 33 and resistors 31, 34, and 35. In this example, the transistors 32 and 33 are N-channel MOS (Metal Oxide Semiconductor) FETs (Field-Effect Transistors). A gate of the transistor 32, to which the signal UP2 is provided, corresponds to the positive input terminal of the driver circuit 30; a source is coupled to one end of the resistor 31; and a drain is coupled to a drain of the transistor 33 and one end of the resistor 35. A gate of the transistor 33, to which the signal DN2 is provided, corresponds to the negative input terminal of the driver circuit 30; a source is coupled to one end of the resistor 34; and a drain is coupled to the drain of the transistor 32 and the one end of the resistor 35. The one end of the resistor 31 is coupled to the source of the transistor 32, and a voltage V1 is provided to the other end thereof. The voltage V1 may be, for example, 400 [mV]. The one end of the resistor 34 is coupled to the source of the transistor 33, and the other end is grounded. The one end of the resistor 35 is coupled to the drains of the transistors 32 and 33, and the other end corresponding to the output terminal of the driver circuit 30 is coupled to the output terminal Tout. In this example, a sum of a resistance of the resistor 31, an on-resistance of the transistor 32, and a resistance of the resistor 35 is in the order of about 100 [Ω]. Similarly, a sum of a resistance of the resistor 34, an on-resistance of the transistor 33, and a resistance of the resistor 35 is in the order of about 100 [Ω] in this example.

As with the driver circuit 30, the driver circuit 40 has transistors 42 and 43, and resistors 41, 44, and 45. In this example, the transistors 42 and 43 are N-channel MOS FETs. A gate of the transistor 42, to which the signal UP3 is provided, corresponds to the positive input terminal of the driver circuit 40; a source is coupled to one end of the resistor 41; and a drain is coupled to a drain of the transistor 43 and one end of the resistor 45. A gate of the transistor 43, to which the signal DN3 is provided, corresponds to the negative input terminal of the driver circuit 40; a source is coupled to one end of the resistor 44; and a drain is coupled to the drain of the transistor 42 and the one end of the resistor 45. The first end of the resistor 41 is coupled to the source of the transistor 42, and the voltage V1 is provided to the second end thereof. The first end of the resistor 44 is coupled to the source of the transistor 43, and the second end is grounded. The first end of the resistor 45 is coupled to the drains of the transistors 42 and 43, and the second end corresponding to the output terminal of the driver circuit 40 is coupled to the output terminal Tout. In this example, a sum of a resistance of the resistor 41, an on-resistance of the transistor 42, and a resistance of the resistor 45 is in the order of about 100 [Ω]. Similarly, a sum of a resistance of the resistor 44, an on-resistance of the transistor 43, and a resistance of the resistor 45 is in the order of about 100 [Ω] in this example.

Thus, the output terminal of the driver circuit 30 and the output terminal of the driver circuit 40 are coupled to each other. As described hereinafter, in the transmitting section 11, two out of four transistors 32, 33, 42, and 43 turn on irrespective of any voltage level of the signal SIG. This allows the transmitting section 11 to achieve the output impedance in the order of about 50 [Ω], which makes it easy to attain impedance matching.

FIG. 4 illustrates input/output characteristics of the transmitting section 11. As indicated in FIG. 4, when each of the control signals UP and MM is "1", and the control signal DN is "0", the signal SIG becomes a high-level voltage VH. Further, when each of the control signals DN and MM is "1", and the control signal UP is "0", the signal SIG becomes a low-level voltage VL. Moreover, when the control signal MM is "0", the signal SIG becomes a medium-level voltage VM independently of levels of the control signals UP and DN. More specifically, the control signal MM is a signal controlling to determine whether the signal SIG is set to the medium-level voltage VM, and the transmitting section 11 sets the signal SIG to the medium-level voltage VM when the control signal MM is "0". Alternatively, when the control signal MM is "1", the transmitting section 11 sets the signal SIG to the high-level voltage VH or the low-level voltage VL depending on levels of the control signals UP and DN.

As described above, each of the transmitting sections 11A to 11C outputs one of three voltage levels (high-level voltage VH, low-level voltage VL, and medium-level voltage VM). On this occasion, in the transmitter 10, three transmitting sections 11A to 11C output voltage levels different from one another. In other words, voltage levels of the signals SIGA, SIGB, and SIGC are different from one another.

FIG. 5 illustrates a configuration example of the receiver 100. The receiver 100 receives the signals SIGA, SIGB, and SIGC. The receiver 100 has resistors 101A to 101C and amplifiers 102A to 102C.

Each of the resistors 101A to 101C functions as a termination resistor in the communication system 1, and a resistance thereof may be in the order of about 50 [Ω] in this example. One end of the resistor 101A, to which the signal SIGA is provided, is coupled to an input terminal TinA and any other terminal. One end of the resistor 101B, to which the signal SIGB is provided, is coupled to an input terminal TinB and any other terminal. One end of the resistor 101C, to which the signal SIGC is provided, is coupled to an input terminal TinC and any other terminal. The other end of the resistor 101A is coupled to the other end of the resistors 101B and the other end of the resistor 101C. The other end of the resistor 101B is coupled to the other end of the resistor 101A and the other end of the resistor 101C. The other end of the resistor 101C is coupled to the other end of the resistor 101A and the other end of the resistor 101B.

Each of the amplifiers 102A to 102C outputs "1" or "0" depending on a difference between a signal on a positive input terminal and a signal on a negative input terminal. A positive input terminal of the amplifier 102A, to which the signal SIGA is provided, is coupled to a negative input terminal of the amplifier 102C, the one end of the resistor 101A, and the input terminal TinA, and a negative input terminal thereof, to which the signal SIGB is provided, is coupled to a positive input terminal of the amplifier 102B, the one end of the resistor 101B, and the input terminal TinB. The positive input terminal of the amplifier 102B, to which the signal SIGB is provided, is coupled to the negative input terminal of the amplifier 102A, the one end of the resistor 101B, and the input terminal TinB, and a negative input terminal thereof, to which the signal SIGC is provided, is coupled to a positive input terminal of the amplifier 102C, the one end of the resistor 101C, and the input terminal TinC. The positive input terminal of the amplifier 102C, to which the signal SIGC is provided, is coupled to the negative input terminal of the amplifier 102B, the one end of the resistor 101C, and the input terminal TinC, and a negative input terminal thereof, to which the signal SIGC is provided, is coupled to the positive input terminal of the amplifier 102A, the one end of the resistor 101A, and the input terminal TinA.

FIG. 6 illustrates an operation example of the receiver 100. In this example, the signal SIGA is the high-level voltage VH; the signal SIGB is the low-level voltage VL; and the signal SIGC is the medium-level voltage VM. In this case, a current Iin flows through the input terminal TinA, the resistor 101A, the resistor 101B, and the input terminal TinB in this order. Thereafter, the high-level voltage VH is provided on the positive input terminal of the amplifier 102A, while the low-level voltage VL is provided on the negative input terminal, and the amplifier 102A outputs "1". Further, the low-level voltage VL is provided on the positive input terminal of the amplifier 102B, while the medium-level voltage VM is provided on the negative input terminal, and the amplifier 102B outputs "0". Moreover, the medium-level voltage VM is provided on the positive input terminal of the amplifier 102C, while the high-level voltage VH is provided on the negative input terminal, and the amplifier 102C outputs "0".

In such a manner, in the receiver 100, each of the amplifiers 102A to 102C outputs "1" or "0" depending on a difference between two of the signals SIGA to SIGC, and a subsequent-stage circuit performs a predetermined processing operation on the basis of the output signal.

Here, each of the "transistors 32 and 42" corresponds to a specific example of a "first switch" in the present disclosure. Each of the "transistors 33 and 43" corresponds to a specific example of a "second switch" in the present disclosure.

[Operation and Function]

Subsequently, the description will be provided on operation and function of the communication system 1 according to the present embodiment.

(Overview of Overall Operation)

First, an overview of the overall operation of the communication system 1 is described with reference to FIG. 1 and FIG. 2. The transmitting section 11A generates the signal SIGA on the basis of the control signals UPA, DNA, and MMA to transmit the signal SIGA to the receiver 100 via the transmission line 9A. Similarly, the transmitting section 11B generates the signal SIGB on the basis of the control signals UPB, DNB, and MMB to transmit the signal SIGB to the receiver 100 via the transmission line 9B, and the transmitting section 11C generates the signal SIGC on the basis of the control signals UPC, DNC, and MMC to transmit the signal SIGC to the receiver 100 via the transmission line 9C. Then, the receiver 100 receives the signals SIGA, SIGB, and SIGC.

(Detailed Operation of Transmitting Section 11)

In each transmitting section 11 (transmitting sections 11A to 11C), the controller 20 generates the signals UP2, DN2, UP3, and DN3 on the basis of the control signals UP, DN, and MM. Subsequently, the driver 13 generates the signal SIG (signals SIGA to SIGC) on the basis of the signals UP2, DN2, UP3, and DN3. Hereinafter, the description is provided on the detailed operation of the transmitting section 11.

FIG. 7 illustrates an operation example of the transmitting section 11, and (A) denotes a waveform of the control signal UP or the control signal DN; (B) denotes a waveform of the signal UP1 or the signal DN1; (C) denotes a waveform of the control signal MM; (D) denotes a waveform of the signal MM1; (E) denotes a waveform of the signal Mflag; (F) denotes a waveform of the signal UP2 or the signal DN2; (G) denotes a waveform of the signal UP3 or the signal DN3; and (H) denotes a waveform of the signal SIG.

The control signals UP, DN, and MM each having a minimum pulse width of a time P are provided to the transmitting section 11. The time delay circuit 21 delays the control signal UP by the delay amount td1 to generate the signal UP1, and similarly the time delay circuit 22 delays the control signal DN by the delay amount td1 to generate the signal DN1 ((A) and (B) of FIG. 7). Further, the time delay circuit 23 delays the control signal MM by the delay amount td2 to generate the signal MM1 ((C) and (D) of FIG. 7). The AND circuit 26 calculates the logical AND of the control signal MM and the signal MM1 to generate the signal Mflag ((C) to (E) of FIG. 7).

Since the signal Mflag is "1" prior to timing t3, the logic circuit 24 outputs the signal UP1 as the signal UP2, and the logic circuit 25 outputs the signal DN1 as the signal DN2 ((F) of FIG. 7). Likewise, the AND circuit 27 outputs the signal UP1 as the signal UP3, and the AND circuit 28 outputs the signal DN1 as the signal DN3 ((G) of FIG. 7). Then, the driver 13 performs transition of the signal SIG between the high-level voltage VH and the low-level voltage VL depending on variations in these signals UP2, DN2, UP3, and DN3 ((H) of FIG. 7).

FIG. 8A illustrates an operational state of the driver 13 in a case where the signal SIG is set to the high-level voltage VH. In FIG. 8A, each of the transistors 32, 33, 42, and 43 is depicted as a switch showing an operational state thereof. In this case, the signals UP2 and UP3 become "1", and the signals DN2 and DN3 become "0". Accordingly, the transistors 32 and 42 turn on, and the transistors 33 and 43 turn off. As a result, a current I1 flows through the resistor 31, the transistor 32, and the resistor 35 in this order, and a current I2 flows through the resistor 41, the transistor 42, and the resistor 45 in this order. Consequently, the signal SIG becomes the high-level voltage VH.

FIG. 8B illustrates an operational state of the driver 13 in a case where the signal SIG is set to the low-level voltage VL. In this case, the signals UP2 and UP3 become "0", and the signals DN2 and DN3 become "1". Accordingly, the transistors 32 and 42 turn off, and the transistors 33 and 43 turn on. As a result, a current I3 flows through the resistor 35, the transistor 33, and the resistor 34 in this order, and a current I4 flows through the resistor 45, the transistor 43, and the resistor 44 in this order. Consequently, the signal SIG becomes the low-level voltage VL.

Transition of the signal SIG involves a certain amount of time. In performing transition of the signal SIG, the driver 13 starts transition of the signal SIG in timing when the signals UP2, DN2, UP3, and DN3 vary (for example, but not limited to, timing t1 and timing t2) ((H) of FIG. 7). In concrete terms, as illustrated in FIG. 8A, the driver 13 starts transition of the signal SIG from the low-level voltage VL toward the high-level voltage VH by turning on the transistors 32 and 42 and flowing the currents I1 and I2. Alternatively, as illustrated in FIG. 8B, the driver 13 starts transition of the signal SIG from the high-level voltage VH toward the low-level voltage VL by turning on the transistors 33 and 43 and flowing the currents I3 and I4. Then, after a predetermined time has elapsed since start of the transition, the signal SIG reaches the high-level voltage VH or the low-level voltage VL, resulting in completion of the transition.

Next, in timing t3, the signal Mflag varies from "1" to "0" ((E) of FIG. 7). Consequently, the logic circuit 24 sets the signal UP2 to "1", and the logic circuit 25 sets the signal DN2 to "1" ((F) of FIG. 7). Similarly, the AND circuit 27 sets the signal UP3 to "0", and the AND circuit 28 sets the signal DN3 to "0" ((G) of FIG. 7). Accordingly, the driver 13 performs transition of the signal SIG from the high-level voltage VH or the low-level voltage VL to the medium-level voltage VM ((H) of FIG. 7).

FIG. 8C illustrates an operational state of the driver 13 in a case where the signal SIG is set to the medium-level voltage VM. In this case, the signals UP2 and DN2 become "1", and the signals UP3 and DN3 become "0". Accordingly, the transistors 32 and 42 turn on, and the transistors 33 and 43 turn off. More specifically, so-called Thevenin termination is achieved in the driver 13. As a result, a current I5 flows through the resistor 31 and the transistor 32 in this order, and a current I6 flows through the transistor 33 and the resistor 34 in this order. Consequently, the signal SIG becomes the medium-level voltage VM.

In performing transition of the signal SIG, the driver 13 starts transition of the signal SIG in timing t3 ((H) of FIG. 7). In concrete terms, as illustrated in FIG. 8C, the driver 13 starts transition of the signal SIG from the low-level voltage VL or the high-level voltage VH toward the medium-level voltage VM by turning on the transistors 32 and 33 and flowing the currents I5 and I6. Then, after a predetermined time has elapsed since start of the transition, the signal SIG reaches the medium-level voltage VM, resulting in completion of the transition.

Next, in timing t5, the signal Mflag varies from "0" to "1" ((E) of FIG. 7). Consequently, the logic circuit 24 outputs the signal UP1 as the signal UP2, and the logic circuit 25 outputs the signal DN1 as the signal DN2 ((F) of FIG. 7). Similarly, the AND circuit 27 outputs the signal UP1 as the signal UP3, and the AND circuit 28 outputs the signal DN1 as the signal DN3 ((G) of FIG. 7). Accordingly, the driver 13 performs transition of the signal SIG from the medium-level voltage VM to the high-level voltage VH or the low-level voltage VL ((H) of FIG. 7). On this occasion, the driver 13 starts transition of the signal SIG in this timing t5. In concrete terms, as illustrated in FIG. 8A, the driver 13 starts transition of the signal SIG from the medium-level voltage VM toward the high-level voltage VH by turning on the transistors 32 and 42 and flowing the currents I1 and I2. Alternatively, as illustrated in FIG. 8B, the driver 13 starts transition of the signal SIG from the medium-level voltage VM toward the low-level voltage VL by turning on the transistors 33 and 43 and flowing the currents I3 and I4. Then, after a predetermined time has elapsed since start of the transition, the signal SIG reaches the high-level voltage VH or the low-level voltage VL, resulting in completion of the transition.

As described above, the transmitting section 11 delays the control signals UP and DN by the delay amount td1, and delays the control signal MM by the delay amount td2, thereby controlling the driver 13 on the basis of the delayed signals. This allows the transmitting section 11 to shift start timing of each transition in the signal SIG.

FIG. 9 illustrates each transition of the signal SIG, and (A) depicts each transition in a superimposed manner; (B) denotes transition Thm from the high-level voltage VH to the medium-level voltage VM and transition Tlm from the low-level voltage VL to the medium-level voltage VM; (C) denotes transition Thl from the high-level voltage VH to the low-level voltage VL and transition Tlh from the low-level voltage VL to the high-level voltage VH; and (D) denotes transition Tmh from the medium-level voltage VM to the high-level voltage VH and transition Tml from the medium-level voltage VM to the low-level voltage VL. It is to be noted that each transition of the signal SIG may actually exhibit, for example, a waveform that looks like converging gradually toward a target voltage; however, FIG. 9 illustrates each transition with a straight line for convenience of explanation.

As illustrated in FIG. 9, in the transmitting section 11, start timing t11 of the transition Thm and Tlm ((B) of FIG. 9) is set as timing earlier than start timing t12 of the transition Thl and Tlh ((C) of FIG. 9). Here, a difference between the timing t11 and the timing t12 corresponds to the delay amount td1 of the time delay circuits 21 and 22. In such a manner, it is possible to substantially match end timing of the transition Thm and Tlm and cross-timing of the transition Thl and Tlh by shifting start timing of the transition. More specifically, a slew rate of the transition Thm and Tlm is lower than that of the transition Thl and Tlh. Therefore, in the transmitting section 11, it is possible to substantially match the end timing of the transition Thm and Tlm and the cross-timing of the transition Thl and Tlh by starting the transition Thm and Tlm earlier than the transition Thl and Tlh.

Further, in the transmitting section 11, start timing t13 of the transition Tmh and Tml ((D) of FIG. 9) is set as timing later than the start timing t12 of the transition Thl and Tlh ((C) of FIG. 9). Here, a difference between the timing t11 and the timing t13 corresponds to the delay amount td2 of the time delay circuit 23. In such a manner, it is possible to substantially match start timing of the transition Tmh and Tml and cross-timing of the transition Thl and Tlh by delaying the start timing of the transition Tmh and Tml.

As described above, in the transmitting section 11, the end timing of the transition Thm and Tlm, the cross-timing of the transition Thl and Tlh, and the start timing of the transition Tmh and Tml are substantially matched by shifting start timing of each transition. This makes it possible to widen an eye aperture in an eye diagram of the signal SIG.

FIG. 10 illustrates an eye diagram of the signal SIG. In the signal SIG, two eye apertures E1 and E2 are produced. The eye aperture E1 is produced between the high-level voltage VH and the medium-level voltage VM, and the eye aperture E2 is produced between the medium-level voltage VM and the low-level voltage VL. A time width of each of the eye apertures E1 and E2 is substantially the same as the time P. As described above, the transmitting section 11 is provided with the time delay circuits 21 to 23 to shift start timing of each transition, it is therefore possible to widen time widths of the eye apertures E1 and E2 as compared with a case of a comparative example to be hereinafter described, leading to the improved communication quality as a result.

Further, as illustrated in FIGS. 8A to 8C, in the transmitting section 11, two out of four transistors 32, 33, 42, and 43 turn on irrespective of voltage levels of the signal SIG. In concrete terms, the transmitting section 11 turns on the transistors 32 and 42 when the signal SIG is set to the high-level voltage VH (FIG. 8A), turns on the transistors 33 and 43 when the signal SIG is set to the low-level voltage VL (FIG. 8B), and turns on the transistors 32 and 33 when the signal SIG is set to the medium-level voltage VM (FIG. 8C). This allows the transmitting section 11 to maintain the output impedance in the order of about 50 [Ω] independently of voltage levels of the signal SIG, which makes it possible to achieve impedance matching more easily.

(Comparative Example)

Next, the description is provided on a transmitting section 11R according to a comparative example.

FIG. 11 illustrates a configuration example of the transmitting section 11R according to the comparative example. The transmitting section 11R has a controller 20R. The controller 20R has logic circuits 24 and 25, and AND circuits 27 and 28. The controller 20R is similar to the controller 20 according to the above-described first embodiment, except that the time delay circuits 21 to 23 and the AND circuit 26 are omitted. In other words, the logic circuit 24 and the AND circuit 27 operate on the basis of the control signals UP and MM, and the logic circuit 25 and the AND circuit 28 operate on the basis of the control signals DN and MM.

FIG. 12 illustrates an operation example of the transmitting section 11R, and (A) denotes a waveform of the control signal UP or the control signal DN; (B) denotes a waveform of the control signal MM; (C) denotes a waveform of the signal UP2 or the signal DN2; (D) denotes a waveform of the signal UP3 or the signal DN3; and (E) denotes a waveform of the signal SIG.

Since the control signal MM is "1" prior to timing t23, the logic circuit 24 outputs the control signal UP as the signal UP2, and the logic circuit 25 outputs the control signal DN as the signal DN2 ((C) of FIG. 12). Likewise, the AND circuit 27 outputs the control signal UP as the signal UP3, and the AND circuit 28 outputs the control signal DN as the signal DN3 ((D) of FIG. 12). Then, the driver 13 performs transition of the signal SIG between the high-level voltage VH and the low-level voltage VL depending on variations in these signals UP2, DN2, UP3, and DN3 ((E) of FIG. 12). On this occasion, the driver 13 starts transition of the signal SIG in timing when the signals UP2, DN2, UP3, and DN3 vary (for example, but not limited to, timing t21 and timing t22). Then, after a predetermined time has elapsed since start of the transition, the signal SIG reaches the high-level voltage VH or the low-level voltage VL, resulting in completion of the transition.

Next, in timing t23, the control signal MM varies from "1" to "0" ((B) of FIG. 12). Consequently, the logic circuit 24 sets the signal UP2 to "1", and the logic circuit 25 sets the signal DN2 to "1" ((C) of FIG. 12). Similarly, the AND circuit 27 sets the signal UP3 to "0", and the AND circuit 28 sets the signal DN3 to "0" ((D) of FIG. 12). Accordingly, the driver 13 performs transition of the signal SIG from the high-level voltage VH or the low-level voltage VL to the medium-level voltage VM ((E) of FIG. 12). On this occasion, the driver 13 starts transition of the signal SIG in this timing t23. Then, after a predetermined time has elapsed since start of the transition, the signal SIG reaches the medium-level voltage VM, resulting in completion of the transition.

Subsequently, in timing t24, the control signal MM varies from "0" to "1" ((B) of FIG. 12). Consequently, the logic circuit 24 outputs the control signal UP as the signal UP2, and the logic circuit 25 outputs the control signal DN as the signal DN2 ((C) of FIG. 12). Similarly, the AND circuit 27 outputs the control signal UP as the signal UP3, and the AND circuit 28 outputs the control signal DN as the signal DN3 ((D) of FIG. 12). Accordingly, the driver 13 performs transition of the signal SIG from the medium-level voltage VM to the high-level voltage VH or the low-level voltage VL ((E) of FIG. 12). On this occasion, the driver 13 starts transition of the signal SIG in this timing t24. Then, after a predetermined time has elapsed since start of the transition, the signal SIG reaches the high-level voltage VH or the low-level voltage VL, resulting in completion of the transition.

FIG. 13 illustrates each transition of the output signal SIG from the transmitting section 11R, and (A) depicts each transition in a superimposed manner; (B) denotes transition Thm and transition Tlm; (C) denotes transition Thl and transition Tlh; and (D) denotes transition Tmh and transition Tml. As seen from FIG. 13, in the transmitting section 11R according to the present comparative example, start timing of the transition Thm and Tlm ((B) of FIG. 13), start timing of the transition Thl and Tlh ((C) of FIG. 13), and start timing of the transition Tmh and Tml ((D) of FIG. 13) are substantially consistent with one another. As a result, in the transmitting section 11R, jitter J takes place in the signal SIG as illustrated in (A) of FIG. 13.

FIG. 14 illustrates an eye diagram of the signal SIG in the transmitting section 11R. In the signal SIG, two eye apertures ER1 and ER2 are produced as with the case of the present embodiment. A time width of each of the eye apertures ER1 and ER2 is equivalent to a value derived by subtracting a time related to the jitter J from the time P. In other words, the time width of each of the eye apertures ER1 and ER2 is narrower than the time width of each of the eye apertures E1 and E2 according to the present embodiment (FIG. 10). As a result, this may cause communication quality to be degraded in the transmitting section 11R.

In contrast, in the transmitting section 11 according to the present embodiment, the time delay circuits 21 to 23 are provided to shift start timing of each transition. In concrete terms, as illustrated in FIG. 9, start timing of the transition Thm and Tlm ((B) of FIG. 9) is set as timing earlier than the start timing of the transition Thl and Tlh ((C) of FIG. 9), and start timing of the transition Tmh and Tml ((D) of FIG. 9) is set as timing later than the start timing of the transition Thl and Tlh ((C) of FIG. 9). The start timing of each transition is shifted from the start timing of other transition in the transmitting section 11 in such a manner; therefore, it is possible to widen time widths of the eye apertures in the eye diagram of the signal SIG, leading to the improved communication quality as a result.

[Effects]

As described thus far, in the first embodiment, the start timing of each transition is shifted from the start timing of other transition, thus allowing communication quality to be improved.

Further, in the present embodiment, the driver is Thevenin-terminated in setting the signal SIG to the medium-level voltage, and therefore it is possible to achieve the impedance matching more easily.

[Modification Example 1-1]

In the above-described present embodiment, the driver 13 is Thevenin-terminated in setting the signal SIG to the medium-level voltage VM; however, the configuration is not limited thereto. Hereinafter, a transmitting section 14 according to this modification example is described in detail.

FIG. 15 illustrates a configuration example of the transmitting section 14. The transmitting section 14 has a controller 29 and a driver circuit 50. The controller 29 generates the signals UP3 and DN3 on the basis of the control signals UP, DN, and MM. The controller 29 has the time delay circuits 21 to 23 and the AND circuits 26 to 28. In other words, the controller 29 is similar to the controller 20 according to the above-described first embodiment, except that the logic circuits 24 and 25 are omitted. The driver circuit 50 generates the signal SIG on the basis of the signals UP3 and DN3.

FIG. 16 illustrates a configuration example of the driver circuit 50. As with the driver circuits 30 and 40 according to the above-described first embodiment, the driver circuit 50 has transistors 52 and 53, and resistors 51, 54, and 55. In this example, the transistors 52 and 53 are N-channel MOS FETs. A gate of the transistor 52, to which the signal UP3 is provided from the controller 29, corresponds to a positive input terminal of the driver circuit 50; a source is coupled to one end of the resistor 51; and a drain is coupled to a drain of the transistor 53 and one end of the resistor 55. A gate of the transistor 53, to which the signal DN3 is provided from the controller 29, corresponds to a negative input terminal of the driver circuit 50; a source is coupled to one end of the resistor 54; and a drain is coupled to the drain of the transistor 52 and the one end of the resistor 55. The one end of the resistor 51 is coupled to the source of the transistor 52, and a voltage V1 is provided to the other end of the resistor 51. The one end of the resistor 54 is coupled to the source of the transistor 53, and the other end is grounded. The one end of the resistor 55 is coupled to the drains of the transistors 52 and 53, and the other end corresponding to an output terminal of the driver circuit 50 is coupled to the output terminal Tout. In this example, a sum of a resistance of the resistor 51, an on-resistance of the transistor 52, and a resistance of the resistor 55 is in the order of about 50 [Ω]. Similarly, a sum of a resistance of the resistor 54, an on-resistance of the transistor 53, and a resistance of the resistor 55 is in the order of about 50 [Ω] in this example.

FIG. 17 illustrates an operation example of the transmitting section 14, and (A) denotes a waveform of the control signal UP or the control signal DN; (B) denotes a waveform of the signal UP1 or the signal DN1; (C) denotes a waveform of the control signal MM; (D) denotes a waveform of the signal MM1; (E) denotes a waveform of the signal Mflag; (F) denotes a waveform of the signal UP3 or the signal DN3; and (G) denotes a waveform of the signal SIG.

Since the signal Mflag is "1" prior to timing t43, the AND circuit 27 outputs the signal UP1 as the signal UP3, and the AND circuit 28 outputs the signal DN1 as the signal DN3 ((F) of FIG. 17). Then, the driver circuit 50 performs transition of the signal SIG between the high-level voltage VH and the low-level voltage VL depending on variations in these signals UP3 and DN3 ((G) of FIG. 17).

FIG. 18A illustrates an operational state of the driver circuit 50 in a case where the signal SIG is set to the high-level voltage VH. In this case, the signal UP3 becomes "1", and the signal DN3 becomes "0". Accordingly, the transistor 52 turns on, and the transistor 53 turns off. As a result, a current I7 flows through the resistor 51, the transistor 52, and the resistor 55 in this order. Consequently, the signal SIG becomes the high-level voltage VH.

FIG. 18B illustrates an operational state of the driver circuit 50 in a case where the signal SIG is set to the low-level voltage VL. In this case, the signal UP3 becomes "0", and the signal DN3 becomes "1". Accordingly, the transistor 52 turns off, and the transistor 53 turns on. As a result, a current I8 flows through the resistor 55, the transistor 53, and the resistor 54 in this order. Consequently, the signal SIG becomes the low-level voltage VL.

In performing transition of the signal SIG, the driver circuit 50 starts transition of the signal SIG in timing when the signals UP3 and DN3 vary (for example, but not limited to, timing t41 and timing t42) ((G) of FIG. 17). Then, after a predetermined time has elapsed since start of the transition, the signal SIG reaches the high-level voltage VH or the low-level voltage VL, resulting in completion of the transition.

Next, in timing t43, the signal Mflag varies from "1" to "0" ((E) of FIG. 17). Consequently, the AND circuit 27 sets the signal UP3 to "0", and the AND circuit 28 sets the signal DN3 to "0" ((F) of FIG. 17). Accordingly, the driver circuit 50 performs transition of the signal SIG from the high-level voltage VH or the low-level voltage VL to the medium-level voltage VM ((G) of FIG. 7).

FIG. 18C illustrates an operational state of the driver circuit 50 in a case where the signal SIG is set to the medium-level voltage VM. In this case, since both of the signals UP3 and DN3 become "0", both of the transistors 52 and 53 turn off. More specifically, the output impedance of the driver circuit 50 is placed in a high-impedance state. As a result, the signal SIG is set to the medium-level voltage VM via the resistors 101A to 101C of a receiving circuit 90.

In performing transition of the signal SIG, the driver circuit 50 starts transition of the signal SIG in timing t43 ((G) of FIG. 17). Then, after a predetermined time has elapsed since start of the transition, the signal SIG reaches the medium-level voltage VM, resulting in completion of the transition.

Next, in timing t45, the signal Mflag varies from "0" to "1" ((E) of FIG. 17). Consequently, the AND circuit 27 outputs the signal UP1 as the signal UP3, and the AND circuit 28 outputs the signal DN1 as the signal DN3 ((F) of FIG. 17). Accordingly, the driver circuit 50 performs transition of the signal SIG from the medium-level voltage VM to the high-level voltage VH or the low-level voltage VL ((G) of FIG. 17). On this occasion, the driver circuit 50 starts transition of the signal SIG in this timing t45. Then, after a predetermined time has elapsed since start of the transition, the signal SIG reaches the high-level voltage VH or the low-level voltage VL, resulting in completion of the transition.

With such a configuration, it is also possible to obtain the effects similar to those attained by the transmitting section 11 according to the above-described first embodiment.

[Modification Example 1-2]

In the above-described embodiment, the signal DN2 is provided to the negative input terminal of the driver circuit 30, and the signal DN3 is provided to the negative input terminal of the driver circuit 40; however, the configuration is not limited thereto. Alternatively, for example, like a transmitting section 15 as illustrated in FIG. 19, the signal DN2 may be provided to the negative input terminal of the driver circuit 40, and the signal DN3 may be provided to the negative input terminal of the driver circuit 30. In this case, in setting the signal SIG to the medium-level voltage VM, the transistor 32 of the driver circuit 30 and the transistor 43 of the driver circuit 40 turn on. With such a configuration, it is also possible to obtain the effects similar to those attained by the transmitting section 11 according to the above-described first embodiment.

[Modification Example 1-3]

In the above-described embodiment, the time delay circuits 21 and 22 delay the input signal by the delay amount td1, and the time delay circuit 23 delays the input signal by the delay amount td2; however, the configuration is not limited thereto. Alternatively, for example, like a transmitting section 16 as illustrated in FIG. 20, configuration may be made to allow for variable delay amounts. This transmitting section 16 has a controller 60. The controller 60 has time delay circuits 61 to 63 and a delay amount setter 64. The time delay circuit 61 is configured to allow the delay amount to be varied on the basis of a delay control signal CTL1, and delays the control signal UP and outputs the delayed control signal UP as the signal UP1. The time delay circuit 62 is configured to allow the delay amount to be varied on the basis of a delay control signal CTL2, and delays the control signal DN and outputs the delayed control signal DN as the signal DN1. The time delay circuit 63 is configured to allow the delay amount to be varied on the basis of a delay control signal CTL3, and delays the control signal MM and outputs the delayed control signal MM as the signal MM1. The delay amount setter 64 sets the delay amounts of the time delay circuits 61 to 63 via the delay control signals CTL1 to CTL3. This allows the transmitting section 16 to adjust the delay amounts of the time delay circuits 61 to 63, which makes it possible to adjust time widths of the eye apertures E1 and E2 as a result.

Further, for example, like a communication system 2 as illustrated in FIG. 21, the delay amount may be controlled on the basis of an instruction from a receiver. The communication system 2 has a receiver 110 and a transmitter 70. The receiver 110 has a detector 111. This detector 111 detects eye apertures and jitter of signals SIGA to SIGC, and outputs a detection result as a signal DET. The transmitter 70 has transmitting sections 71A to 71C. Each of the transmitting sections 71A to 71C has a configuration similar to that of the transmitting section 16 (FIG. 20), and is configured to allow the delay amounts of the time delay circuits 61 to 63 to be varied on the basis of the signal DET.

For this communication system 2, for example, in a calibration mode, the delay amounts of the time delay circuits 61 to 63 are adjusted to widen time widths of the eye apertures E1 and E2. In concrete terms, to begin with, the transmitter 70 sends the signals SIGA to SIGC each having a predetermined pattern for calibration. Then, the receiver 110 detects eye apertures and jitter of the signals SIGA to SIGC, and notifies the transmitter 70 of the detection result. Subsequently, the transmitter 70 changes the delay amounts of the time delay circuits 61 to 63 on the basis of this detection result. By repeating such an operation, for example, more than once, it is possible to adjust the delay amounts of the time delay circuits 61 to 63 so as to widen time widths of the eye apertures E1 and E2. Thereafter, following adjustment of the delay amounts, the calibration mode is finished to carry out normal data transmission. For example, such a calibration may be performed at power-on time, on a regular basis, or at a time when the amount of data to be communicated is small.

<2. Second Embodiment>

Next, the description is provided on a communication system 3 according to a second embodiment. In the second embodiment, there are provided transmitting sections that perform preemphasis. Any other configurations are similar to those in the above-described first embodiment (FIG. 1 and other drawings). It is to be noted that any component parts essentially same as those in the communication system 1 according to the above-described first embodiment are denoted with the same reference numerals, and the related descriptions are omitted as appropriate.

As illustrated in FIG. 1, the communication system 3 has a transmitter 80. The transmitter 80 has three transmitting sections 81A, 81B, and 81C. It is to be noted that a transmitting section 81 is hereinafter used as appropriate as a section representing any one of the transmitting sections 81A, 81B, and 81C.

FIG. 22 illustrates a configuration example of the transmitting section 81. The transmitting section 81 has a controller 90 and the driver 13. The controller 90 has time delay circuits 91 to 93, a logic circuits 94, and selectors 95 and 96. The time delay circuit 91 delays the control signal DN by a delay amount td11. The time delay circuit 92 delays the control signal UP by the delay amount td11. The time delay circuit 93 delays the control signal MM by the delay amount td11, and outputs such the delayed control signal MM as the signal Mflag. More specifically, the delay amounts of the time delay circuits 91 to 93 are identical to one another. The logic circuits 94 calculates the logical AND of an inverse signal of the control signal MM and the signal Mflag, and outputs a result as a signal MP. The selector 95 outputs an output signal of the time delay circuit 91 as a signal UP1 when the signal MP is "1", and outputs the control signal UP as the signal UP1 when the signal MP is "0". The selector 96 outputs an output signal of the time delay circuit 92 as the signal DN1 when the signal MP is "1", and outputs the control signal DN as the signal DN1 when the signal MP is "0".

FIG. 23 illustrates an operation example of the transmitting section 81, and (A) denotes a waveform of the control signal UP or the control signal DN; (B) denotes a waveform of the control signal MM; (C) denotes a waveform of the signal Mflag; (D) denotes a waveform of the signal MP; (E) denotes a waveform of the signal UP1 or the signal DN1; (F) denotes a waveform of the signal UP2 or the signal DN2; (G) denotes a waveform of the signal UP3 or the signal DN3; and (H) denotes a waveform of the signal SIG.

The time delay circuit 93 delays the control signal MM by the delay amount td11 to generate the signal Mflag ((B) and (C) of FIG. 23). Then, the logic circuit 94 calculates the logical AND of an inverse signal of the control signal MM and the signal Mflag to generate the signal MP ((B) to (D) of FIG. 23). When this signal MP is "0", the selector 95 outputs the control signal UP as the signal UP1, and the selector 96 outputs the control signal DN as the signal DN1 ((E) of FIG. 23). Further, when the signal MP is "1", the selector 95 outputs an output signal of the time delay circuit 91 as the signal UP1, and the selector 96 outputs an output signal of the time delay circuit 92 as the signal DN1.

Since the signal Mflag is "1" prior to timing t54, the logic circuit 24 outputs the signal UP1 as the signal UP2, and the logic circuit 25 outputs the signal DN1 as the signal DN2 ((F) of FIG. 23). Likewise, the AND circuit 27 outputs the signal UP1 as the signal UP3, and the AND circuit 28 outputs the signal DN1 as the signal DN3 ((G) of FIG. 23). Then, the driver 13 performs transition of the signal SIG between the high-level voltage VH and the low-level voltage VL depending on variations in these signals UP2, DN2, UP3, and DN3 ((H) of FIG. 23).

On this occasion, before or after timing t53 when the MP signal varies from "0" to "1", both of the signals UP1 and DN1 are inverted. In other words, the control signal UP and the control signal DN are inverted to each other, and therefore, for example, the control signal UP during a period of timing t52 to timing t53 may become an inverted signal of an output signal of the time delay circuit 91 (namely, delayed control signal DN) during a period of timing t53 to timing t54. The signals UP1 and DN1 are inverted before or after the timing t53 in such a manner, and therefore the signals UP2, DN2, UP3, and DN3 are also inverted before or after the timing t53.

Accordingly, when the signal SIG transits from the low-level voltage VL to the medium-level voltage VM during a period of timing t53 to timing t54, both of the transistors 32 and 42 turn on in the driver 13 as illustrated in FIG. 8A. As a result, the signal SIG varies as if to transit from the low-level voltage VL to the high-level voltage VH to reach the medium-level voltage VM. Similarly, when the signal SIG transits from the high-level voltage VH to the medium-level voltage VM, both of the transistors 33 and 43 turn on in the driver 13 as illustrated in FIG. 8B. As a result, the signal SIG varies as if to transit from the high-level voltage VH to the low-level voltage VL to reach the medium-level voltage VM. In such a manner, the transmitting section 81 performs preemphasis during a period of timing t53 to timing t54.

Next, in timing t54, the signal Mflag varies from "1" to "0" ((C) of FIG. 23). Consequently, the logic circuit 24 sets the signal UP2 to "1", and the logic circuit 25 sets the signal DN2 to "1" ((F) of FIG. 23). Similarly, the AND circuit 27 sets the signal UP3 to "0", and the AND circuit 28 sets the signal DN3 to "0" ((G) of FIG. 23). At this time, both of the transistors 33 and 43 turn on in the driver 13 as illustrated in FIG. 8C, resulting in Thevenin termination being achieved. Accordingly, after that, the signal SIG maintains the medium-level voltage VM ((H) of FIG. 23).

Next, in timing t56, the signal Mflag varies from "0" to "1" ((C) of FIG. 23). Consequently, the logic circuit 24 outputs the signal UP1 as the signal UP2, and the logic circuit 25 outputs the signal DN1 as the signal DN2 ((F) of FIG. 23). Similarly, the AND circuit 27 outputs the signal UP1 as the signal UP3, and the AND circuit 28 outputs the signal DN1 as the signal DN3 ((G) of FIG. 23). Accordingly, the driver 13 performs transition of the signal SIG from the medium-level voltage VM to the high-level voltage VH or the low-level voltage VL ((H) of FIG. 23).

As described above, the preemphasis is carried out in the transmitting section 81 at the time of transition from the high-level voltage VH or the low-level voltage VL to the medium-level voltage VM. This makes it possible to perform the transition from the high-level voltage VH or the low-level voltage VL to the medium-level voltage VM in less time.

FIG. 24 illustrates each transition of the signal SIG, and (A) depicts each transition in a superimposed manner; (B) denotes transition Thm from the high-level voltage VH to the medium-level voltage VM and transition Tlm from the low-level voltage VL to the medium-level voltage VM; (C) denotes transition Thl from the high-level voltage VH to the low-level voltage VL and transition Tlh from the low-level voltage VL to the high-level voltage VH; and (D) denotes transition Tmh from the medium-level voltage VM to the high-level voltage VH and transition Tml from the medium-level voltage VM to the low-level voltage VL.

As illustrated in FIG. 24, in the transmitting section 81, a slew rate of the transition Thm and Tlm ((B) of FIG. 24) is made almost equal to a slew rate of the transition Thl and Tlh ((C) of FIG. 24). More specifically, in the transmitting section 81, for example, when the signal SIG transits from the high-level voltage VH to the medium-level voltage VM, the signal SIG varies as if to transit from the high-level voltage VH to the low-level voltage VL with the help of the preemphasis. Similarly, for example, when the signal SIG transits from the low-level voltage VL to the medium-level voltage VM, the signal SIG varies as if to transit from the low-level voltage VL to the high-level voltage VH with the help of the preemphasis. Therefore, in the transmitting section 81, it is possible to substantially match the end timing of the transition Thm and Tlm and the cross-timing of the transition Thl and Tlh.

Further, as with the case of the above-described first embodiment (FIG. 9), in the transmitting section 81, start timing t62 of the transition Tmh and Tml ((D) of FIG. 24) is set as timing later than the start timing t61 of the transition Thl and Tlh ((C) of FIG. 24). Here, a difference between the timing t61 and the timing t62 corresponds to the delay amount td11 of the time delay circuits 91 to 93. Thus, it is possible to substantially match start timing of the transition Tmh and Tml and cross-timing of the transition Thl and Tlh by delaying the start timing of the transition Tmh and Tml.

As described above, in the transmitting section 81, the preemphasis is carried out when the signal SIG transits from the high-level voltage VH or the low-level voltage VL to the medium-level voltage VM, and the start timing is delayed when the signal SIG transits from the medium-level voltage VM to the high-level voltage VH or the low-level voltage VL. This allows the transmitting section 81 to substantially match the end timing of the transition Thm and Tlm, the cross-timing of the transition Thl and Tlh, and the start timing of the transition Tmh and Tml. This makes it possible to widen eye apertures in an eye diagram of the signal SIG, leading to the improved communication quality.

As described thus far, in the present embodiment, the preemphasis is carried out at the time of transition from the high-level voltage or the low-level voltage to the medium-level voltage, and therefore it is possible to improve communication quality. Any other effects are similar to those attained in the case of the above-described first embodiment.

[Modification Example 2-1]

In the above-described embodiment, the driver 13 is Thevenin-terminated in setting the signal SIG to the medium-level voltage VM; however, the configuration is not limited thereto. Hereinafter, a transmitting section 84 according to this modification example is described in detail.

FIG. 25 illustrates a configuration example of the transmitting section 84. The transmitting section 84 has a controller 99 and the driver circuit 50. The controller 99 generates the signals UP3 and DN3 on the basis of the control signals UP, DN, and MM. The controller 99 has the time delay circuits 91 to 93, the logic circuit 94, the selectors 95 and 96, and AND circuits 27 and 28. In other words, the controller 99 is similar to the controller 90 according to the above-described second embodiment, except that the logic circuits 24 and 25 are omitted.

FIG. 26 illustrates an operation example of the transmitting section 84, and (A) denotes a waveform of the control signal UP or the control signal DN; (B) denotes a waveform of the control signal MM; (C) denotes a waveform of the signal Mflag; (D) denotes a waveform of the signal MP; (E) denotes a waveform of the signal UP1 or the signal DN1; (F) denotes a waveform of the signal UP3 or the signal DN3; and (G) denotes a waveform of the signal SIG.

Since the signal Mflag is "1" prior to timing t74, the AND circuit 27 outputs the signal UP1 as the signal UP3, and the AND circuit 28 outputs the signal DN1 as the signal DN3 ((F) of FIG. 26). Then, the driver 50 performs transition of the signal SIG between the high-level voltage VH and the low-level voltage VL depending on variations in these signals UP3 and DN3 ((G) of FIG. 26). At this time, as with the transmitting section 81 according to the above-described second embodiment, the transmitting section 84 carries out the preemphasis during a period of timing t73 to timing t74, and the signal SIG reaches the medium-level voltage VM in the timing t74.

Next, in the timing t74, the signal Mflag varies from "1" to "0" ((C) of FIG. 26). Consequently, the AND circuit 27 sets the signal UP3 to "0", and the AND circuit 28 sets the signal DN3 to "0" ((F) of FIG. 26). At this time, both of the transistors 52 and 53 turn off in the driver circuit 50 as illustrated in FIG. 18C, resulting in the output impedance being placed in a high-impedance state. Accordingly, after that, the signal SIG maintains the medium-level voltage VM ((G) of FIG. 26).

Next, in timing t76, the signal Mflag varies from "0" to "1" ((C) of FIG. 26). Consequently, the AND circuit 27 outputs the signal UP1 as the signal UP3, and the AND circuit 28 outputs the signal DN1 as the signal DN3 ((F) of FIG. 26). Accordingly, the driver circuit 50 performs transition of the signal SIG from the medium-level voltage VM to the high-level voltage VH or the low-level voltage VL ((G) of FIG. 26).

With such a configuration, it is also possible to obtain the effects similar to those attained by the transmitting section 81 according to the above-described second embodiment.

[Other Modification Examples]

Each of the modification examples of the above-described first embodiment may be applicable to the transmitting section 81 according to the above-described second embodiment.

<3. Third Embodiment>

Next, the description is provided on a communication system 4 according to a third embodiment. In the third embodiment, there are provided transmitting sections that perform the preemphasis in a different manner from the transmitting section 81 according to the second embodiment. Any other configurations are similar to those in the above-described first embodiment (FIG. 1 and other drawings). It is to be noted that any component parts essentially same as those in the communication system 1 according to the above-described first embodiment are denoted with the same reference numerals, and the related descriptions are omitted as appropriate.

As illustrated in FIG. 1, the communication system 4 has a transmitter 120. The transmitter 120 has three transmitting sections 121A, 121B, and 121C. It is to be noted that a transmitting section 121 is hereinafter used as appropriate as a section representing any one of the transmitting sections 121A, 121B, and 121C.

FIG. 27 illustrates a configuration example of the transmitting section 121. The transmitting section 121 has a controller 130 and the driver 13. The controller 130 has time delay circuits 131 to 133, a logic circuit 134, and OR circuits 135 and 136. The time delay circuit 131 delays the control signal UP by a delay amount td21, and outputs the delayed control signal UP as a signal UP4. The time delay circuit 132 delays the control signal DN by the delay amount td21, and outputs the delayed control signal DN as a signal DN4. More specifically, the delay amount of the time delay circuits 131 and 132 is identical. The time delay circuit 133 delays the control signal MM by a delay amount td22, and outputs the delayed control signal MM as a signal MM2. The delay amount td22 of the time delay circuit 133 is greater than the delay amount td21 specified in the time delay circuits 131 and 132 (td22>td21). The logic circuit 134 calculates the logical AND of an inverse signal of the control signal MM and the signal Mflag, and outputs a result as the signal MP. The OR circuit 135 calculates the logical AND of the signal UP4 and the signal MP, and outputs a result as the signal UP1. The OR circuit 136 calculates the logical AND of the signal DN4 and the signal MP, and outputs a result as the signal DN1.

FIG. 28 illustrates an operation example of the transmitting section 121, and (A) denotes a waveform of the control signal UP or the control signal DN; (B) denotes a waveform of the signal UP4 or the signal DN4; (C) denotes a waveform of the control signal MM; (D) denotes a waveform of the signal Mflag; (E) denotes a waveform of the signal MP; (F) denotes a waveform of the signal UP1 or the signal DN1; (G) denotes a waveform of the signal UP2 or the signal DN2; (H) denotes a waveform of the signal UP3 or the signal DN3; and (I) denotes a waveform of the signal SIG.

The time delay circuit 131 delays the control signal UP by the delay amount td21 to generate the signal UP4, and the time delay circuit 132 delays the control signal DN by the delay amount td21 to generate the signal DN4 ((A) and (B) of FIG. 28). The time delay circuit 133 delays the control signal MM by the delay amount td22 to generate the signal Mflag ((C) and (D) of FIG. 28). The logic circuit 134 calculates the logical AND of an inverse signal of the control signal MM and the signal Mflag to generate the signal MP ((E) of FIG. 28). The OR circuit 135 calculates the logical AND of the control signal UP4 and the signal MP to generate the signal UP1, and the OR circuit 136 calculates the logical AND of the signal DN4 and the signal MP to generate the signal DN1 ((F) of FIG. 28).

Since the signal Mflag is "1" prior to timing t84, the logic circuit 24 outputs the signal UP1 as the signal UP2, and the logic circuit 25 outputs the signal DN1 as the signal DN2 ((G) of FIG. 28). Likewise, the AND circuit 27 outputs the signal UP1 as the signal UP3, and the AND circuit 28 outputs the signal DN1 as the signal DN3 ((H) of FIG. 28). Then, the driver 13 performs transition of the signal SIG between the high-level voltage VH and the low-level voltage VL depending on variations in these signals UP2, DN2, UP3, and DN3 ((I) of FIG. 28).

At this time, because the signal MP is "1" during a period of timing t83 to timing t84, the signals UP1 and DN1 also become "1", and the signals UP2, DN2, UP3, and DN3 become "1" as well. Accordingly, the driver 13 performs transition of the signal SIG from the high-level voltage VH or the low-level voltage VL to the medium-level voltage VM ((I) of FIG. 28).

FIG. 29 illustrates an operational state of the driver 13 in a case where the signal SIG is set to the medium-level voltage VM. In this case, the signals UP2, DN2, UP3, and DN3 become "1", and therefore the transistors 32, 33, 42, and 43 turn on. More specifically, so-called Thevenin termination is achieved in the driver 13. As a result, the current I5 flows through the resistor 31 and the transistor 32 in this order, and the current I6 flows through the transistor 33 and the resistor 34 in this order. Similarly, the current I7 flows through the resistor 41 and the transistor 42 in this order, and the current I8 flows through the transistor 43 and the resistor 44 in this order. Consequently, the signal SIG becomes the medium-level voltage VM.

Next, in timing t84, the signal Mflag varies from "1" to "0" ((D) of FIG. 28). Consequently, the logic circuit 24 sets the signal UP2 to "1", and the logic circuit 25 sets the signal DN2 to "1" ((G) of FIG. 28). Similarly, the AND circuit 27 sets the signal UP3 to "0", and the AND circuit 28 sets the signal DN3 to "0" ((H) of FIG. 28). At this time, both of the transistors 33 and 43 turn on in the driver 13 as illustrated in FIG. 8C, resulting in Thevenin termination being achieved. Accordingly, after that, the signal SIG maintains the medium-level voltage VM ((I) of FIG. 28).

Next, in timing t85, the signal Mflag varies from "0" to "1" ((D) of FIG. 28). Consequently, the logic circuit 24 outputs the signal UP1 as the signal UP2, and the logic circuit 25 outputs the signal DN1 as the signal DN2 ((G) of FIG. 28). Similarly, the AND circuit 27 outputs the signal UP1 as the signal UP3, and the AND circuit 28 outputs the signal DN1 as the signal DN3 ((H) of FIG. 28). Accordingly, the driver 13 performs transition of the signal SIG from the medium-level voltage VM to the high-level voltage VH or the low-level voltage VL ((I) of FIG. 28).

As described above, in the transmitting section 121, the preemphasis is carried out through the Thevenin termination at the time of transition from the high-level voltage VH or the low-level voltage VL to the medium-level voltage VM. This makes it possible to perform the transition from the high-level voltage VH or the low-level voltage VL to the medium-level voltage VM in less time.

FIG. 30 illustrates each transition of the signal SIG, and (A) depicts each transition in a superimposed manner; (B) denotes transition Thm from the high-level voltage VH to the medium-level voltage VM and transition Tlm from the low-level voltage VL to the medium-level voltage VM; (C) denotes transition Thl from the high-level voltage VH to the low-level voltage VL and transition Tlh from the low-level voltage VL to the high-level voltage VH; and (D) denotes transition Tmh from the medium-level voltage VM to the high-level voltage VH and transition Tml from the medium-level voltage VM to the low-level voltage VL.

As illustrated in FIG. 30, in the transmitting section 121, start timing t91 of the transition Thm and Tlm ((B) of FIG. 30) is set as timing earlier than start timing t92 of the transition Thl and Tlh ((C) of FIG. 30). Here, a difference between the timing t91 and the timing t92 corresponds to the delay amount td21 of the time delay circuits 131 and 132. In such a manner, it is possible to substantially match end timing of the transition Thm and Tlm and cross-timing of the transition Thl and Tlh by shifting start timing of the transition. More specifically, in the transmitting section 121, the preemphasis is carried out through the Thevenin termination in the transition Thm and Tlm; however, a slew rate of the transition Thm and Tlm is lower than that of the transition Thl and Tlh in this example. Therefore, in the transmitting section 11, it is possible to substantially match the end timing of the transition Thm and Tlm and the cross-timing of the transition Thl and Tlh by starting the transition Thm and Tlm earlier than the transition Thl and Tlh.

Further, as with the case of the above-described first embodiment (FIG. 9), in the transmitting section 121, start timing t93 of the transition Tmh and Tml ((D) of FIG. 30) is set as timing later than the start timing t92 of the transition Thl and Tlh ((C) of FIG. 30). Here, a difference between the timing t91 and the timing t93 corresponds to the delay amount td22 of the time delay circuit 133. In such a manner, it is possible to substantially match start timing of the transition Tmh and Tml and cross-timing of the transition Thl and Tlh by delaying the start timing of the transition Tmh and Tml.

As described above, in the transmitting section 121, the preemphasis is carried out through the Thevenin termination and the start timing of the transition is put ahead when the signal SIG transits from the high-level voltage VH or the low-level voltage VL to the medium-level voltage VM. Further, in the transmitting section 121, the start timing of the transition is put off when the signal SIG transits from the medium-level voltage VM to the high-level voltage VH or the low-level voltage VL. This allows the transmitting section 121 to substantially match the end timing of the transition Thm and Tlm, the cross-timing of the transition Thl and Tlh, and the start timing of the transition Tmh and Tml. As a result, this makes it possible to widen eye apertures in an eye diagram of the signal SIG, leading to the improved communication quality.

As described thus far, in the third embodiment, the preemphasis is carried out through the Thevenin termination at the time of transition from the high-level voltage or the low-level voltage to the medium-level voltage, and therefore it is possible to increase a signal slew rate, leading to the improved communication quality.

Further, in the third embodiment, at the time of transition from the high-level voltage or the low-level voltage to the medium-level voltage, the start timing of the transition is adjusted in addition to the preemphasis to be performed through the Thevenin termination, and therefore it is possible to widen eye apertures in the eye diagram of the signal SIG, leading to the improved communication quality.

Any other effects are similar to those attained in the case of the above-described first embodiment.

[Modification Example 3-1]

In the above-described third embodiment, the driver 13 is Thevenin-terminated in setting the signal SIG to the medium-level voltage VM; however, the configuration is not limited thereto. Hereinafter, a transmitting section 124 according to this modification example is described in detail.

FIG. 31 illustrates a configuration example of the transmitting section 124. The transmitting section 124 has a controller 139 and the driver circuit 50. The controller 139 generates the signals UP3 and DN3 on the basis of the control signals UP, DN, and MM. The controller 139 has the time delay circuits 131 to 133, the logic circuit 134, OR circuits 135 and 136, and the AND circuits 27 and 28. In other words, the controller 139 is similar to the controller 130 according to the above-described third embodiment, except that the logic circuits 24 and 25 are omitted.

FIG. 32 illustrates an operation example of the transmitting section 124, and (A) denotes a waveform of the control signal UP or the control signal DN; (B) denotes a waveform of the signal UP4 or the signal DN4; (C) denotes a waveform of the control signal MM; (D) denotes a waveform of the signal Mflag; (E) denotes a waveform of the signal MP; (F) denotes a waveform of the signal UP1 or the signal DN1; (G) denotes a waveform of the signal UP3 or the signal DN3; and (H) denotes a waveform of the signal SIG.

Since the signal Mflag is "1" prior to timing t104, the AND circuit 27 outputs the signal UP1 as the signal UP3, and the AND circuit 28 outputs the signal DN1 as the signal DN3 ((G) of FIG. 32). Then, the driver 50 performs transition of the signal SIG between the high-level voltage VH and the low-level voltage VL depending on variations in these signals UP3 and DN3 ((H) of FIG. 32). At this time, as with the transmitting section 121 according to the above-described third embodiment, the transmitting section 124 carries out the preemphasis through the Thevenin-termination during a period of timing t103 to timing t104, and the signal SIG reaches the medium-level voltage VM in the timing t104.

Next, in the timing t104, the signal Mflag varies from "1" to "0" ((D) of FIG. 32). Consequently, the AND circuit 27 sets the signal UP3 to "0", and the AND circuit 28 sets the signal DN3 to "0" ((G) of FIG. 32). At this time, both of the transistors 52 and 53 turn off in the driver circuit 50 as illustrated in FIG. 18C, resulting in the output impedance being placed in a high-impedance state. Accordingly, after that, the signal SIG maintains the medium-level voltage VM ((H) of FIG. 32).

Next, in timing t105, the signal Mflag varies from "0" to "1" ((D) of FIG. 32). Consequently, the AND circuit 27 outputs the signal UP1 as the signal UP3, and the AND circuit 28 outputs the signal DN1 as the signal DN3 ((G) of FIG. 32). Accordingly, the driver circuit 50 performs transition of the signal SIG from the medium-level voltage VM to the high-level voltage VH or the low-level voltage VL ((H) of FIG. 32).

With such a configuration, it is also possible to obtain the effects similar to those attained by the transmitting section 121 according to the above-described third embodiment.

[Other Modification Examples]

Each of the modification examples of the above-described first embodiment may be applicable to the transmitting section 121 according to the above-described third embodiment.

<4. Application Examples>

Next, the description is provided on application examples of the transmitter explained in any of the above-described embodiments and modification examples.

FIG. 33 illustrates an external view of a smartphone 300 (multifunctional mobile phone) to which the transmitter according to any of the above-described embodiments and modification examples thereof is applied. A variety of devices are built into this smartphone 300, and the transmitter according to any of the above-described embodiments and modification examples is applied in a communication system in which data communication is made among these devices.

FIG. 34 illustrates a configuration example of an application processor 310 to be used in the smartphone 300. The application processor 310 has a CPU (Central Processing Unit) 311, a memory controller 312, a power supply controller 313, an external interface 314, a GPU (Graphics Processing Unit) 315, a media processor 316, a display controller 317, and an MIPI (Mobile Industry Processor Interface) interface 318. In this example, the CPU 311, the memory controller 312, the power supply controller 313, the external interface 314, the GPU 315, the media processor 316, and the display controller 317 are coupled to a system bus 319 to allow for data communication among these sections via this system bus 319.

The CPU 311 processes various information to be handled in the smartphone 300 in accordance with programs. The memory controller 312 controls a memory 501 to be used by the CPU 311 for information processing operation. The power supply controller 313 controls a power supply of the smartphone 300.

The external interface 314 is an interface for communication with external devices, and is coupled to a wireless communication section 502 and an image sensor 503 in this example. The wireless communication section 502 performs wireless communication with mobile phone base stations, and may include, for example, a baseband section, an RF (Radio Frequency) front-end section, and other components. The image sensor 503 acquires images, and may include, for example, a CMOS sensor.

The GPU 315 carries out image processing operation. The media processor 316 processes information such as voice, characters, and graphics. The display controller 317 controls a display 504 via the MIPI interface 318. The MIPI interface 318 transmits image signals to the display 504. As such image signals, for example, YUV format, RGB format, and other format signals may be used. For example, the transmitter according to any of the above-described embodiments and modification examples may be applicable to this MIPI interface 318.

FIG. 35 illustrates a configuration example of an image sensor 410. The image sensor 410 has a sensor section 411, an ISP (Image Signal Processor) 412, a JPEG (Joint Photographic Experts Group) encoder 413, a CPU 414, a RAM (Random Access Memory) 415, a ROM (Read Only Memory) 416, a power supply controller 417, an I²C (Inter-Integrated Circuit) interface 418, and an MIPI interface 419. In this example, each of these blocks is coupled to a system bus 420 to allow for data communication among these blocks via this system bus 420.

The sensor section 411 acquires images, and may be configured of, for example, a CMOS sensor. The ISP 412 performs predetermined processing operation for the images acquired by the sensor section 411. The JPEG encoder 413 encodes the images processed by the ISP 412 to generate JPEG-format images. The CPU 414 controls each block of the image sensor 410 in accordance with programs. The RAM 415 is a memory to be used by the CPU 414 for information processing operation. The ROM 416 stores programs to be executed in the CPU 414. The power supply controller 417 controls a power supply of the image sensor 410. The I²C interface 418 receives control signals from the application processor 310. Further, although not illustrated, the image sensor 410 also receives clock signals from the application processor 310 in addition to the control signals. In concrete terms, the image sensor 410 is configured to be operable on the basis of clock signals at various frequencies. The MIPI interface 419 transmits image signals to the application processor 310. As such image signals, for example, YUV format, RGB format, and other format signals may be used. For example, the transmitter according to any of the above-described embodiments and modification examples may be applicable to this MIPI interface 419.

The present technology is described thus far with reference to some embodiments and modification examples, and the application examples to electronic apparatuses; however, the present technology is not limited thereto, and may be modified in a variety of ways.

For example, in each of the above-described embodiments, the transmitting section 11 is configured to allow for generation of three voltage levels (high-level voltage VH, low-level voltage VL, and medium-level voltage VM); however, the configuration is not limited thereto. Alternatively, for example, the transmitting section 11 may be configured to allow for generation of four or more voltage levels.

Further, for example, in each of the above-described embodiments, the transmitter 10 is provided with three transmitting sections 11A to 11C; however, the configuration is not limited thereto. Alternatively, the transmitter 10 may be provided with two or less or four or more transmitting sections.

It is to be noted that the effects described in the present specification are illustrative and non-limiting, and any other effects may be available.

It is to be noted that the present technology may include the following configurations.

(1) A transmitter including:
an output terminal;
a driver that performs transition of a voltage of the output terminal among a plurality of voltages; and
a controller that controls the driver to cause transition start timing in one voltage transition in voltage transition among the plurality of voltages to be later than transition start timing in another voltage transition.

(2) The transmitter according to (1), wherein the plurality of voltages include a first voltage, a second voltage, and a third voltage between the first voltage and the second voltage.

(3) The transmitter according to (2), wherein transition start timing in voltage transition from the third voltage to the first voltage or the second voltage is later than transition start timing in voltage transition between the first voltage and the second voltage.

(4) The transmitter according to (2) or (3), wherein transition start timing in voltage transition between the first voltage and the second voltage is later than transition start timing in voltage transition from the first voltage or the second voltage to the third voltage.

(5) The transmitter according to any one of (1) to (4), wherein the controller has one or more time delay circuits that set each transition start timing.

(6) The transmitter according to (5), wherein at least one of the one or more time delay circuits is configured to allow a delay amount to be varied.

(7) The transmitter according to (2) or (3), wherein
the driver has two driver circuits, and
each of the driver circuits has
a first switch having one end and the other end, the one end being led to a first power supply that outputs a voltage corresponding to the first voltage, and the other end being led to the output terminal, and
a second switch having one end and the other end, the one end being led to a second power supply that outputs a voltage corresponding to the second voltage, and the other end being led to the output terminal.

(8) The transmitter according to (7), wherein at the time of voltage transition from the first voltage to the third voltage, the controller turns on each of the second switches once and turns off each of the first switches once during a predetermined period, and thereafter turns off one of the second switches and turns on one of the first switches.

(9) The transmitter according to (7), wherein at the time of voltage transition from the first voltage to the third voltage, the controller turns on each of the first switches and each of the second switches once during a predetermined period, and thereafter turns off one of the first switches and one of the second switches.

(10) The transmitter according to (8) or (9), wherein the controller has one or more time delay circuits that set a time length of the predetermined period.

(11) The transmitter according to any one of (7) to (10), wherein
the driver sets a voltage of the output terminal to the first voltage by turning on each of the first switches and turning off each of the second switches,
the driver sets the voltage of the output terminal to the second voltage by turning on each of the second switches and turning off each of the first switches, and
the driver sets the voltage of the output terminal to the third voltage by turning on one of the first switches and turning off the other, and turning on one of the second switches and turning off the other.

(12) The transmitter according to (2) or (3), wherein
the driver has
a first switch having one end and the other end, the one end being led to a first power supply that outputs a voltage corresponding to the first voltage, and the other end being led to the output terminal, and
a second switch having one end and the other end, the one end being led to a second power supply that outputs a voltage corresponding to the second voltage, and the other end being led to the output terminal.

(13) The transmitter according to (12), wherein at the time of voltage transition from the first voltage to the third voltage, the controller turns on the second switch once and turns off the first switch during a predetermined period, and thereafter turns off the second switch.

(14) The transmitter according to (12), wherein at the time of voltage transition from the first voltage to the third voltage, the controller turns on the first switch and the second switch once during a predetermined period, and thereafter turns off each of the first switch and the second switch.

(15) The transmitter according to any one of (12) to (14), wherein
the driver sets a voltage of the output terminal to the first voltage by turning on the first switch and turning off the second switch,
the driver sets a voltage of the output terminal to the second voltage by turning on the second switch and turning off the first switch, and
the driver sets a voltage of the output terminal to the third voltage via one or more termination resistors by turning off the first switch and the second switch.

(16) A communication system provided with a transmitter and a receiver, the transmitter including:
an output terminal;
a driver that performs transition of a voltage of the output terminal among a plurality of voltages; and
a controller that controls the driver to cause transition start timing in one voltage transition in voltage transition among the plurality of voltages to be later than transition start timing in another voltage transition.

(17) The communication system according to (16), wherein the receiver has a detector that acquires one or more parameters on the basis of a received signal, and
the controller sets the transition start timing on the basis of the one or more parameters.

(18) The communication system according to (17), wherein the controller has one or more time delay circuits that set each transition start timing, and adjusts a delay amount in the one or more time delay circuits on the basis of the one or more parameters.

(19) The communication system according to (17) or (18), having a calibration mode, wherein
a calibration mode is provided,
the driver transmits a predetermined signal having a predetermined pattern in the calibration mode,
the detector acquires the one or more parameters on the basis of the predetermined signal, and
the controller sets the transition start timing on the basis of the one or more parameters.

This application claims the benefit of Japanese Priority Patent Application No. JP 2014-062570 filed with the Japan patent office on Mar. 25, 2014, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A transmitter comprising:
an output terminal;
a driver that performs transition of a voltage of the output terminal among a plurality of voltages; and
a controller that controls the driver to cause transition start timing in one voltage transition among the plurality of voltages to be later than transition start timing in another voltage transition,
wherein a first transition start timing in voltage transition from the first voltage or the second voltage to the third voltage is earlier than a second transition start timing in voltage transition between the first voltage and the second voltage, so as to cause an end timing of the first transition and a cross timing of the second transition to substantially match.

2. The transmitter according to claim 1, wherein the second transition start timing in voltage transition between the first voltage and the second voltage is earlier than a third transition start timing in voltage transition from the third voltage to the first voltage or the second voltage.

3. The transmitter according to claim 1, wherein the controller has one or more time delay circuits that set each transition start timing.

4. The transmitter according to claim 3, wherein at least one of the one or more time delay circuits is configured to allow a delay amount to be varied.

5. The transmitter according to claim 1, wherein
the driver has two driver circuits, and
each of the driver circuits has
a first switch having one end and an other end, the one end being led to a first power supply that outputs a voltage corresponding to the first voltage, and the other end being led to the output terminal, and
a second switch having one end and an other end, the one end being led to a second power supply that outputs a voltage corresponding to the second voltage, and the other end being led to the output terminal.

6. The transmitter according to claim 5, wherein at a time of the voltage transition from the first voltage to the third voltage, the controller turns on each of the second switches once and turns off each of the first switches once during a predetermined period, and thereafter turns off one of the second switches and turns on one of the first switches.

7. The transmitter according to claim 6, wherein the controller has one or more time delay circuits that set a time length of the predetermined period.

8. The transmitter according to claim 5, wherein at a time of the voltage transition from the first voltage to the third voltage, the controller turns on each of the first switches and each of the second switches once during a predetermined period, and thereafter turns off one of the first switches and one of the second switches.

9. The transmitter according to claim 5, wherein
the driver sets a voltage of the output terminal to the first voltage by turning on each of the first switches and turning off each of the second switches,
the driver sets the voltage of the output terminal to the second voltage by turning on each of the second switches and turning off each of the first switches, and
the driver sets the voltage of the output terminal to the third voltage by turning on one of the first switches and turning off an other of the first switches, and turning on one of the second switches and turning off an other of the second switches.

10. The transmitter according to claim 1, wherein the driver has
a first switch having one end and an other end, the one end being led to a first power supply that outputs a voltage corresponding to the first voltage, and the other end being led to the output terminal, and
a second switch having one end and an other end, the one end being led to a second power supply that outputs a voltage corresponding to the second voltage, and the other end being led to the output terminal.

11. The transmitter according to claim 10, wherein at a time of voltage transition from the first voltage to the third voltage, the controller turns on the second switch once and turns off the first switch during a predetermined period, and thereafter turns off the second switch.

12. The transmitter according to claim 10, wherein at a time of voltage transition from the first voltage to the third voltage, the controller turns on the first switch and the second switch once during a predetermined period, and thereafter turns off each of the first switch and the second switch.

13. The transmitter according to claim 10, wherein
the driver sets a voltage of the output terminal to the first voltage by turning on the first switch and turning off the second switch,
the driver sets a voltage of the output terminal to the second voltage by turning on the second switch and turning off the first switch, and
the driver sets a voltage of the output terminal to the third voltage via one or more termination resistors by turning off the first switch and the second switch.

14. A communication system provided with a transmitter and a receiver, the transmitter comprising:
an output terminal;
a driver that performs transition of a voltage of the output terminal among a plurality of voltages; and
a controller that controls the driver to cause a first transition start timing in one voltage transition among the plurality of voltages to be later than a second transition start timing in another voltage transition,
wherein
the receiver has a detector that acquires one or more parameters on the basis of a received signal,
the controller sets at least one of the first transition start timing or the second transition start timing on the basis of the one or more parameters, and
the controller has one or more time delay circuits that respectively set the first transition start timing and the second transition start timing, and adjusts a delay amount in the one or more time delay circuits on the basis of the one or more parameters.

15. The communication system according to claim 14, wherein
a calibration mode is provided,
the driver transmits a predetermined signal having a predetermined pattern in the calibration mode,
the detector acquires the one or more parameters on the basis of the predetermined signal, and the controller sets the first transition start timing and the second transition start timing on the basis of the one or more parameters.

* * * * *

UNITED STATES PATENT AND TRADEMARK OFFICE
CERTIFICATE OF CORRECTION

PATENT NO. : 10,194,443 B2
APPLICATION NO. : 15/122312
DATED : January 29, 2019
INVENTOR(S) : Takanori Saeki It is certified that error appears in the above-identified patent and that said Letters Patent is hereby corrected as shown below:

On the Title Page

Item (56) Other Publications:
Please replace "European Application No. 15768262.3," with -- European Application No. 15768268.3 --

Signed and Sealed this
Ninth Day of April, 2019

Andrei Iancu
*Director of the United States Patent and Trademark Office*